(12) United States Patent
Engel

(10) Patent No.: US 7,367,239 B2
(45) Date of Patent: **\*May 6, 2008**

(54) PIEZOCABLE BASED SENSOR FOR MEASURING UNSTEADY PRESSURES INSIDE A PIPE

(75) Inventor: Thomas W. Engel, East Hampton, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/089,089

(22) Filed: Mar. 23, 2005

(65) Prior Publication Data

US 2005/0227538 A1    Oct. 13, 2005

Related U.S. Application Data

(60) Provisional application No. 60/564,866, filed on Apr. 23, 2004, provisional application No. 60/555,589, filed on Mar. 23, 2004.

(51) Int. Cl.
*G01F 1/20* (2006.01)

(52) U.S. Cl. .................................. 73/861.18

(58) Field of Classification Search .................. 73/753, 73/861.18
See application file for complete search history.

(56) References Cited

U.S. PATENT DOCUMENTS

| | | | | |
|---|---|---|---|---|
| 3,149,492 A | * | 9/1964 | Weinberg | 73/724 |
| 4,048,853 A | | 9/1977 | Smith et al. | 73/861.25 |
| 4,080,837 A | | 3/1978 | Alexander et al. | 73/61.45 |
| 4,090,404 A | | 5/1978 | Ligier et al. | |
| 4,144,768 A | * | 3/1979 | Andersson et al. | 73/646 |
| 4,153,747 A | * | 5/1979 | Young et al. | 428/41.5 |
| 4,191,334 A | * | 3/1980 | Bulanda et al. | 24/16 PB |
| 4,216,403 A | | 8/1980 | Claassen et al. | |
| 4,248,085 A | | 2/1981 | Coulthard | 73/861.06 |
| 4,361,937 A | * | 12/1982 | Davis | 24/68 PP |
| 4,376,302 A | | 3/1983 | Miller et al. | |

(Continued)

FOREIGN PATENT DOCUMENTS

FR        2725787        4/1996

(Continued)

OTHER PUBLICATIONS

Federal Specification "Coating, Pipe, Thermoplastic Resin"—L-C-530C. 1987. Accessed online on Aug. 9, 2007. <http://wbdg.org/ccb/FEDMIL/lc530c.pdf>).*

(Continued)

*Primary Examiner*—Edward Lefkowitz
*Assistant Examiner*—Punam Patel

(57) ABSTRACT

A piezocable-based sensor for measuring unsteady pressures inside a pipe comprises at least one cable extending around at least a portion of a circumference of the pipe. The cable includes a first electrical conductor, a piezoelectric material disposed around the first electrical conductor, and a second electrical conductor disposed around the piezoelectric material. The sensor provides a signal indicative of unsteady pressure within the pipe in response to displacement of the pipe. In various embodiments, a band is wrapped around the at least one cable for compressing the at least one cable toward the pipe. In other embodiments, the sensor includes a clamp attached to opposing ends of the at least one cable for holding the at least one cable in tension around the pipe.

41 Claims, 17 Drawing Sheets

U.S. PATENT DOCUMENTS

| | | | |
|---|---|---|---|
| 4,445,389 A | 5/1984 | Potzick et al. | 73/861.27 |
| 4,454,767 A * | 6/1984 | Shinkai et al. | 73/861.18 |
| 4,568,851 A * | 2/1986 | Soni et al. | 310/330 |
| 4,638,207 A | 1/1987 | Radice et al. | |
| 4,706,501 A * | 11/1987 | Atkinson et al. | 73/730 |
| 4,794,295 A | 12/1988 | Penneck et al. | |
| 4,849,946 A * | 7/1989 | Beauducel | 367/155 |
| 4,883,271 A | 11/1989 | French | |
| 4,896,540 A | 1/1990 | Shakkottai et al. | 73/861.02 |
| 5,031,460 A * | 7/1991 | Kanenobu et al. | 73/730 |
| 5,040,415 A | 8/1991 | Barkhoudarian | 73/861.03 |
| 5,083,452 A | 1/1992 | Hope | 73/61 R |
| 5,131,278 A | 7/1992 | Baumoel | |
| 5,218,197 A | 6/1993 | Carroll | 250/227.19 |
| 5,285,675 A | 2/1994 | Colgate et al. | 73/23.2 |
| 5,357,486 A | 10/1994 | Pearce | 367/159 |
| 5,367,911 A * | 11/1994 | Jewell et al. | 73/861.08 |
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,550,791 A | 8/1996 | Peloquin | |
| 5,591,922 A | 1/1997 | Segeral et al. | 73/861.04 |
| 5,670,720 A * | 9/1997 | Clark et al. | 73/730 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,016,702 A | 1/2000 | Maron | 73/705 |
| 6,135,209 A * | 10/2000 | Uhlenkott | 166/369 |
| 6,148,672 A * | 11/2000 | Cawley et al. | 73/622 |
| 6,151,958 A | 11/2000 | Letton et al. | 73/61.79 |
| 6,202,494 B1 | 3/2001 | Riebel et al. | 73/861.29 |
| 6,271,621 B1 * | 8/2001 | Ito et al. | 310/358 |
| 6,349,599 B1 * | 2/2002 | Lynnworth et al. | 73/644 |
| 6,354,147 B1 | 3/2002 | Gysling et al. | 73/61.79 |
| 6,378,357 B1 | 4/2002 | Han et al. | 73/54.41 |
| 6,397,683 B1 * | 6/2002 | Hagenmeyer et al. | 73/861.18 |
| 6,435,030 B1 | 8/2002 | Gysling et al. | 73/587 |
| 6,443,226 B1 | 9/2002 | Diener et al. | 166/241.6 |
| 6,450,037 B1 | 9/2002 | McGuinn et al. | 73/705 |
| 6,463,813 B1 | 10/2002 | Gysling | 73/862.59 |
| 6,526,834 B1 * | 3/2003 | Kohler et al. | 73/777 |
| 6,536,291 B1 | 3/2003 | Gysling et al. | 73/861.42 |
| 6,550,342 B2 | 4/2003 | Croteau et al. | 73/800 |
| 6,558,036 B2 | 5/2003 | Gysling et al. | 374/147 |
| 6,587,798 B2 | 7/2003 | Kersey et al. | 702/50 |
| 6,601,458 B1 | 8/2003 | Gysling et al. | 73/861.04 |
| 6,609,069 B2 | 8/2003 | Gysling | 702/48 |
| 6,644,130 B2 * | 11/2003 | Imai et al. | 73/861.27 |
| 6,668,664 B1 * | 12/2003 | Ohkawa | 73/861.27 |
| 6,691,584 B2 | 2/2004 | Gysling et al. | 73/861.42 |
| 6,698,297 B2 | 3/2004 | Gysling | 73/861.63 |
| 6,732,575 B2 | 5/2004 | Gysling et al. | |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 6,862,920 B2 | 3/2005 | Gysling et al. | 73/61.79 |
| 6,868,737 B2 | 3/2005 | Croteau et al. | 73/800 |
| 6,889,562 B2 | 5/2005 | Gysling et al. | 73/861.42 |
| 6,898,541 B2 | 5/2005 | Gysling et al. | 702/100 |
| 6,945,095 B2 | 9/2005 | Johansen | |
| 6,959,604 B2 | 11/2005 | Davis et al. | |
| 6,971,259 B2 | 12/2005 | Gysling | |
| 7,000,485 B2 * | 2/2006 | Ao et al. | 73/861.29 |
| 7,032,432 B2 | 4/2006 | Gysling et al. | |
| 7,058,549 B2 | 6/2006 | Croteau et al. | |
| 7,062,976 B2 | 6/2006 | Gysling et al. | |
| 7,086,278 B2 | 8/2006 | Gysling et al. | |
| 7,121,152 B2 | 10/2006 | Winston et al. | |
| 2002/0152802 A1 * | 10/2002 | Gysling et al. | 73/61.79 |
| 2003/0010126 A1 | 1/2003 | Romanet et al. | |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2004/0069069 A1 | 4/2004 | Croteau et al. | |
| 2004/0074312 A1 | 4/2004 | Gysling | |
| 2004/0144182 A1 | 7/2004 | Gysling et al. | |
| 2004/0167735 A1 * | 8/2004 | Rothman et al. | 702/100 |
| 2004/0168522 A1 | 9/2004 | Fernald et al. | |
| 2004/0168523 A1 * | 9/2004 | Fernald et al. | 73/861.01 |
| 2004/0226386 A1 | 11/2004 | Gysling et al. | |
| 2004/0231431 A1 | 11/2004 | Sullivan et al. | |
| 2004/0255695 A1 | 12/2004 | Gysling et al. | |
| 2005/0005711 A1 | 1/2005 | Curry et al. | |
| 2005/0005912 A1 | 1/2005 | Gysling et al. | |
| 2005/0011283 A1 | 1/2005 | Gysling et al. | |
| 2005/0011284 A1 | 1/2005 | Gysling et al. | |
| 2005/0044966 A1 | 3/2005 | Croteau et al. | |
| 2005/0072216 A1 | 4/2005 | Engel | |

FOREIGN PATENT DOCUMENTS

| | | |
|---|---|---|
| GB | 2282931 | 4/1995 |
| WO | WO 93/14382 | 7/1993 |
| WO | WO 99/067629 | 12/1999 |
| WO | WO 00/60317 | 10/2000 |
| WO | WO 01/02810 | 1/2001 |
| WO | WO 03/062759 | 7/2003 |

OTHER PUBLICATIONS

"Properties of Piezo Cable"—Measurement Specialities, Inc. Rev. B, May 2001. pp. 1-3. Accessed online on Aug. 9, 2007. <http://www.meas-spec.com/myMeas/download/pdf/english/piezo/RB_PC_02.pdf>.*

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"New Flowmeter Principle"—By: Walt Boyes—Published in Flow Control Magazine—Oct. 2003 Issue.

"Piezoelectric Polymers"—By: J.S. Harrison and Z. Ounaies—ICASE Report.

"Sonar-Based Volumetric Flow Meter for Pulp and Paper Applications"by: D. Gysling & D. Loose.

Sonar-Based Volumetric Flow Meter for Chemical & Petrochemical Applications by: D. Gysling & D. Loose.

"Mass Fraction Measurements in Multiphase Flow using a Clamp on PVDF Array", Johan Carlson, Oct. 2000.

"PVDF and Array Transducers", Robert A. Day, NDTnet—Sep. 1996, vol. 1, No. 9.

"Polymer Piezoelectric Transducers for Ultrasonic NDE", Authors: Yhoseph Bar-Chohen, Tianji Xue And Shyh-Shiuh Lih, NDTnet—Sep. 1996, vol. 1, No. 9.

"Piezofilm Sensors Technical Manual"—Measurement Specialities, Inc. P/N 1005663-1—Rev. B Apr. 2, 2009.

* cited by examiner

PIEZOCABLE BASED SENSOR FOR MEASURING UNSTEADY PRESSURES INSIDE A PIPE

CROSS-REFERENCE TO RELATED APPLICATIONS

The present application claims the benefit of U.S. Provisional Patent Application No. 60/555,589 filed Mar. 23, 2005, and U.S. Provisional Patent Application No. 60/564,866, filed Apr. 23, 2004; each of which is incorporated by reference herein in its entirety.

BACKGROUND OF THE INVENTION

1. Technical Field

The present invention generally relates to an apparatus for measuring unsteady pressures inside a pipe; and more particularly to an apparatus for measuring the same using a piezocable based sensor disposed on an outer surface of the pipe.

2. Background

A fluid flow process (flow process) includes any process that involves the flow of fluid through pipe, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate. Problematically, many sensors must be placed in contact with the fluid and, as a result, cannot be installed, moved or otherwise reconfigured without shutting down a portion of the flow process to install the sensors.

Various non-intrusive sensors have been developed, which are attached to the surface of the pipe. Such sensors include, for example, the ultrasonic transmitter and receiver found in ultrasonic flow meters. While ultrasonic flow meters perform well for certain applications, they are generally limited to use with certain fluid types and/or temperatures. Moreover, precise alignment of the ultrasonic transmitter and receiver pair is required, which may not lend itself to instrument portability and adaptability to different pipe sizes.

In some cases, sensors subjected to severe environmental conditions, such as high temperatures, water spray, precipitation, unintended contact, and the like. Where sensors are used in such conditions, they must be robustly designed to withstand these conditions while maintaining accuracy.

Thus, there remains a need for a robust, non-invasive sensor for measuring various parameters of single and/or multiphase fluids in an industrial flow process that is easily installed and which may be adaptable to different pipe sizes.

SUMMARY OF THE INVENTION

The above-described and other needs are met by a sensor comprising at least one cable extending around at least a portion of a circumference of the pipe. The at least one cable includes: a first electrical conductor, a piezoelectric material disposed around the first electrical conductor, and a second electrical conductor disposed around the piezoelectric material. The at least one cable provides a signal indicative of unsteady pressure within the pipe in response to displacement of the pipe. The at least one cable may include a plurality of cables connected in parallel, and the plurality of cables may have a common outer jacket for securing the plurality of cables together as a ribbon.

In various embodiments, a band is wrapped around the at least one cable and compresses the at least one cable toward the pipe. The at least one cable may be attached to the band. For example, the at least one cable may be attached to the band by at least one of: adhesive, epoxy, and heat-shrink material. At least one spacer may be disposed between the band and the pipe, with the at least one spacer being positioned proximate the ends of the at least one cable for preventing the ends of the at least one cable from being pinched when the band is tightened around the at least one cable. A protective sheet and/or an electrical insulator may be disposed between the at least one cable and the pipe.

In various embodiments, the at least one cable may be mechanically coupled to a protective sheet, with the protective sheet being disposed between the at least one cable and the pipe. In other embodiments, a clamp is attached to opposing ends of the at least one cable for holding the at least one cable in tension around the pipe.

In another aspect, a method of installing at least one sensor on a pipe comprises: wrapping at least one cable around at least a portion of a circumference of the pipe; and electrically connecting the at least one cable to provide a signal indicative of unsteady pressure within the pipe in response to displacement of the pipe. The at least one cable includes: a first electrical conductor, a piezoelectric material disposed around the first electrical conductor, and a second electrical conductor disposed around the piezoelectric material. The at least one cable may further include a plurality of cables having a common outer jacket securing the plurality of cables together as a ribbon.

In various embodiments, the method further includes tightening a band around the at least one cable, wherein the band compresses the at least one cable toward the pipe. The at least one cable may be attached to the band before the at least one cable is wrapped around the pipe. For example, the at least one cable may be attached to the band by at least one of: adhesive, epoxy, and heat-shrink material. The method may further include disposing at least one spacer between the band and the pipe, with the at least one spacer being positioned proximate the ends of the at least one cable for preventing the ends of the at least one cable from being pinched when the band is tightened around the at least one cable.

In another aspect, an apparatus comprises a spatial array of sensors disposed at different axial locations along a pipe. Each of the sensors includes at least one cable extending around at least a portion of a circumference of the pipe, and each cable includes: a first electrical conductor, a piezoelectric material disposed around the first electrical conductor, and a second electrical conductor disposed around the piezoelectric material. A signal processor is configured to receive a signal indicative of unsteady pressure within the pipe from the at least one cable in each sensor and determine a parameter of the fluid using the signals. The parameter of the fluid may include at least one of: density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

The foregoing and other objects, features and advantages of the present invention will become more apparent in light of the following detailed description of exemplary embodiments thereof.

BRIEF DESCRIPTION OF THE DRAWING

Referring now to the drawing wherein like items are numbered alike in the various Figures.

DETAILED DESCRIPTION

Figure 1:
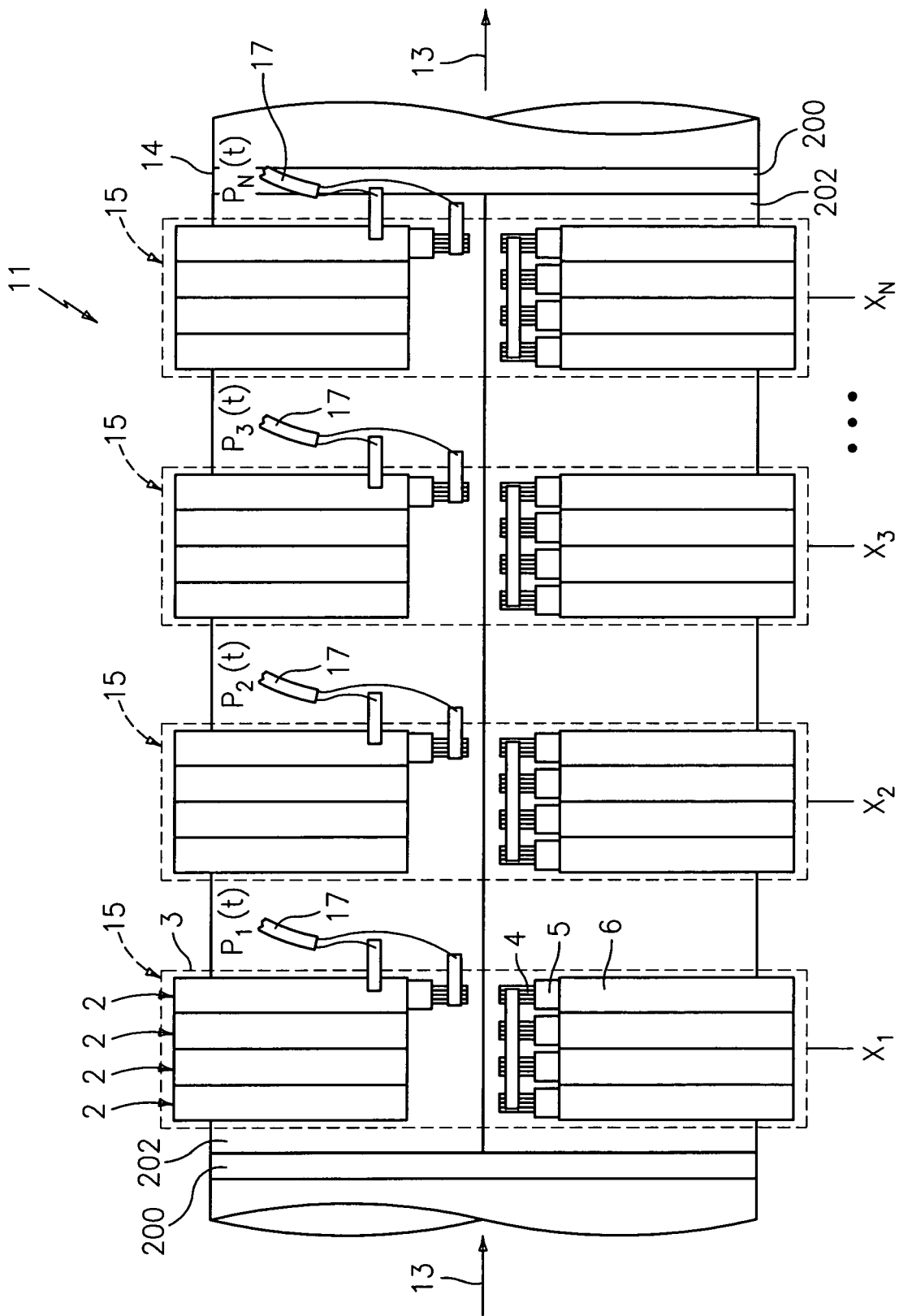
FIG. 1 is a schematic depiction of a spatial array of piezocable based sensors for measuring unsteady pressures inside a pipe, in accordance with an embodiment of the present invention.

Referring to FIG. 1, a schematic depiction of an array 11 of piezocable based sensors 15 disposed at different axial locations $x_1 \ldots x_N$ along a pipe 14 for measuring unsteady pressures inside the pipe 14 is shown. Each sensor 15 comprises a plurality of cables 2 extending around at least a portion of the circumference of the pipe 14. Each cable 2 includes: an inner (first) electrical conductor 4, a piezoelectric material 5 disposed around the inner electrical conductor 4, and an outer (second) electrical conductor 6 disposed around the piezoelectric material 5.

The cable 2 provides a signal indicative of unsteady pressure within the pipe 14 in response to displacement of the pipe 14. More specifically, displacement of the pipe 14, as may be caused by one or both of acoustic waves propagating through a fluid 13 within the pipe and/or pressure disturbances that convect with the fluid 13 flowing in the pipe 14 (e.g., turbulent eddies and vortical disturbances), cause the cable 2 to be strained longitudinally and/or strained radially. In response to this longitudinal and/or radial strain, the piezoelectric material 5 generates a varying electrical charge between the inner and outer conductors 4, 6. The electrical charge varies in proportion to the amount of longitudinal and/or radial strain, and thus provides indication of the amount of displacement of the pipe 14 and, therefore, provides indication of the acoustic waves propagating through the fluid 13 within the pipe 14 and/or pressure disturbances that convect with the fluid 13 flowing in the pipe 14. The varying electrical charge, which may be amplified, impedance converted, and otherwise conditioned (e.g., filtered), is provided as the output signal P(t) from each sensor 15. As will be discussed in further detail hereinafter, these signals $P_1(t) \ldots P_N(t)$ may be used to determine one or more parameters of the fluid 13, such as: density of the fluid 13, volumetric flow rate of the fluid 13, mass flow rate of the fluid 13, composition of the fluid 13, entrained air in the fluid 13, consistency of the fluid 13, size of particles in the fluid 13, and health of a device causing the unsteady pressures to be generated in the pipe 14.

In the embodiment of FIG. 1, a band 3 (shown in phantom) is disposed around the plurality of cables 2 for compressing the plurality of cables 2 toward the pipe 14. Each of the sensors 15 includes at least one length of piezoelectric cable 2 secured along a portion of the length of the band 3. In this embodiment, displacement of the pipe 14, as may be caused by one or both of acoustic waves propagating through a fluid 13 within the pipe and/or pressure disturbances that convect with the fluid 13 flowing in the pipe 14 (e.g., turbulent eddies and vortical disturbances), cause the cable 2 to be strained longitudinally and/or strained radially against the outer band 3.

The band 3 is formed from a relatively rigid material in comparison to the piezoelectric material 5. For example, the band 3 may be formed from metal, fiberglass, polymers, and the like. A lubricating material may be disposed between the band and the cables 2 to prevent binding between the band 3 and cables 2. The band 3 may also be spring loaded (e.g., a spring loaded hose clamp) to insure good contact with the cable 2 in the presence of long term settling.

In each cable 2, the inner conductor 4 forms a core of the cable 2 and is comprised of strands of electrically conductive material (e.g., copper, aluminum, and the like). It is also contemplated that the inner conductor 4 may be solid, or may be strands or an extrusion disposed around another rigid material that forms the core of the cable 2. The piezoelectric material 5 is helically wrapped around the inner conductor 4, although the scope of the invention is intended to include embodiments in which the piezoelectric material 5 is otherwise braided, extruded, or molded around the inner conductor 4. The piezoelectric material 5 may include any piezo-active material (e.g., polyvinylidene fluoride (PVDF)), and may include copolymers of PVDF and other materials such as trifluoroethylene (TrFE) or tetrafluoroethylene (TFE). For example, a description of piezoelectric materials is provided in J. S. Harrison and Z. Ounaies, Piezoelectric Polymers, NASA/CR-2001-211422 ICASE Report No. 2001-43, ICASE Mail Stop 132C NASA Langley Research Center Hampton, Va. 23681-2199, December 2001, pp. 31. The cable 2 is shown as having a circular cross section. It is contemplated, however, that any convenient cross-sectional shape of the cable 2 and/or inner conductor 4 may be used, such as polygonal (e.g., triangular, quadrilateral (e.g., square, rectangular), pentagonal, hexagonal, heptagonal, octagonal, etc.), substantially flat, oval, or ovoid shapes.

The outer conductor 6 is shown as braided strands of electrically conductive material (e.g., copper, aluminum, and the like). It is also contemplated that the outer conductor 6 may be wrapped, extruded, or deposited around the piezoelectric material 5. One example of a cable 2 that may be used with the present invention is commercially available from Measurement Specialties, Inc. of Fairfield, N.J. as part number 1005801-1 or 1005646-1.

Within each sensor 15, the cables 2 may be arranged parallel to, and in contact with, an adjacent cable 2 in the sensor 15, such that the outer conductors 6 of each cable 2 in the array are in electrical connection. The inner conductors 4 may be electrically connected at one end (e.g., by a soldered connection). The cables 2 in each sensor 15 are effectively electrically connected in parallel. The inner and outer conductors 4, 6 of one cable 2 may be coupled by way of an industrial connector to a non-piezoelectric terminal cable 17, such as a low noise coaxial cable to avoid triboelectrically generated noise in the signal from terminal cable 17 shaking and the like. Each terminal cable 17 conducts a respective signal $P_1(t) \ldots P_N(t)$ indicative of unsteady pressure within the pipe 14 to electronic circuitry, as will be described in further detail hereinafter. The ends of the cables 2 opposite the terminal cable 17 are mechanically unrestrained to prevent an overly constrained system.

Figure 2:
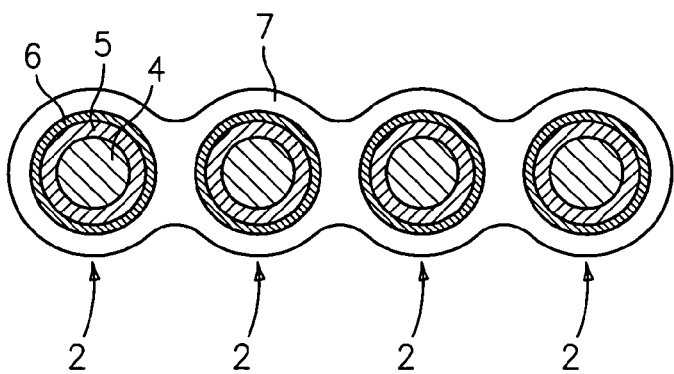
FIG. 2 is a cross-sectional view of a piezocable ribbon that may be used with the sensor of FIG. 1.

While the embodiment of FIG. 1 shows the cables 2 in each sensor 15 contacting each other in side-by-side fashion, it is contemplated that other arrangements may be used. For example, the cables 2 may be separated by a dielectric (electrically insulative) material. For example, as shown in FIG. 2, the plurality of cables may have a common outer jacket 7 securing the cables together as a ribbon. The jacket 7 may be formed from any electrically insulative (dielectric) material to environmentally seal the cable 2 and protect it against thermal stimulus. For example, the jacket 7 may be formed from polyethylene or the like.

Figure 3:
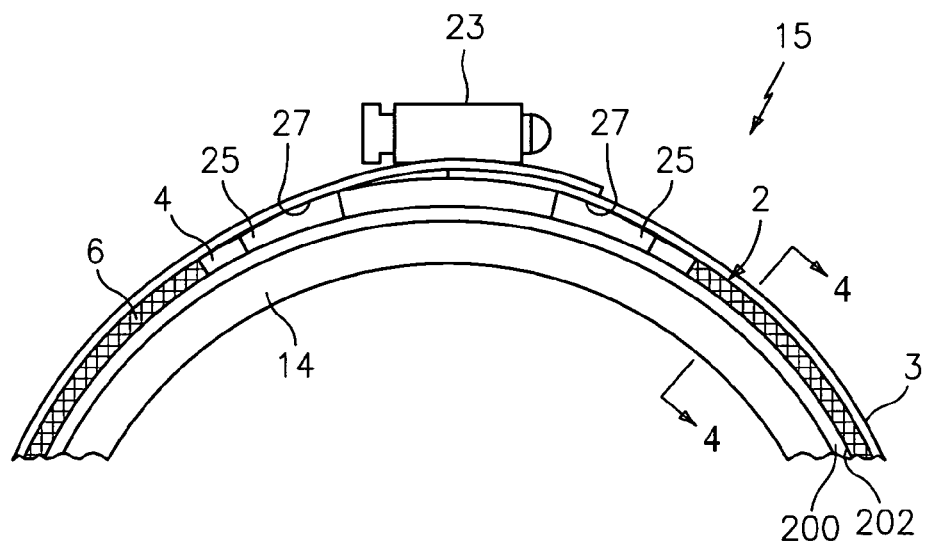
FIG. 3 is a partial, cross-sectional, side elevation view of one of the sensors 15 of FIG. 1.
Figure 4:
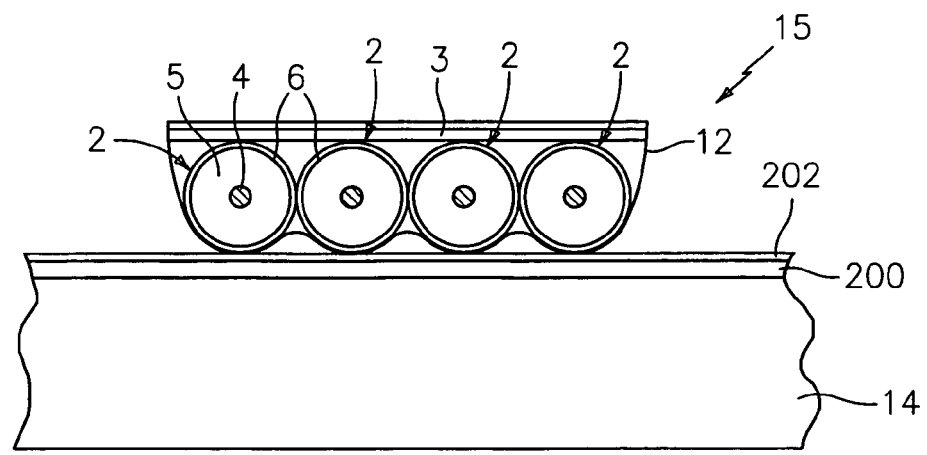
FIG. 4 is a cross-sectional view of one of the sensors 15 taken along section 3-3 of FIG. 3.

FIG. 3 illustrates a partial, cross-sectional, side elevation view of one of the sensors 15 disposed on the pipe 14. FIG. 4 illustrates a cross-sectional view of one of the sensors 15 taken along section 3-3 of FIG. 3, and FIG. 5 illustrates a partial plan view of one of the sensors 15 disposed on the pipe 14.

As best seen in FIG. 4, the cables 2 are secured to the band 3 by any suitable means such as, for example, adhesive, epoxy, and/or heat-shrink material. In the embodiment of FIG. 4, the cables 2 are secured to the band 3 by a sheath 12 of heat-shrink material.

Figure 5:
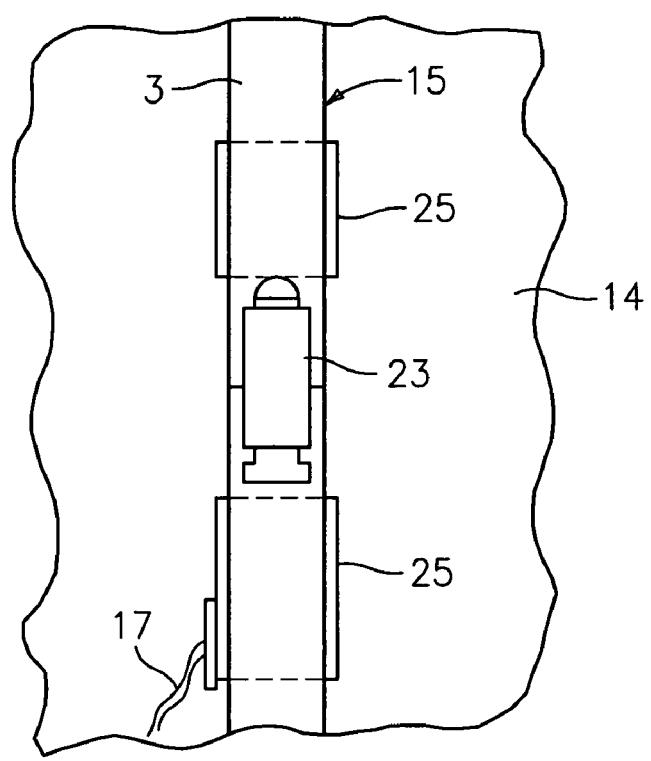
FIG. 5 is a partial plan view of one of the sensors 15 of FIG. 1 disposed on the pipe 14.

Referring to FIGS. 3 and 5, the ends of the band 3 are releasably attached together by a fastener 23 comprising a screw mechanism similar to that of a typical hose clamp. The present invention contemplates that any fastening means, such as bolts, screws, rivets, epoxy, and adhesive, may be used to connect the ends of the bands 3.

Each of the sensors 15 includes at least one spacer 25 disposed between the band 3 and the pipe 14. The spacers 25 are positioned proximate the ends of the plurality of cables 2 for preventing the ends of the cables 2 from being pinched when the band 3 is tightened around the cables 2. The spacers 25 also help to ensure the pressure applied by the band 3 is substantially similar along the length of the cable 2. In the embodiment shown, each of the spacers 25 have an outer contour or chamfer 27 that engages the band 3 proximate each end.

Figure 6:
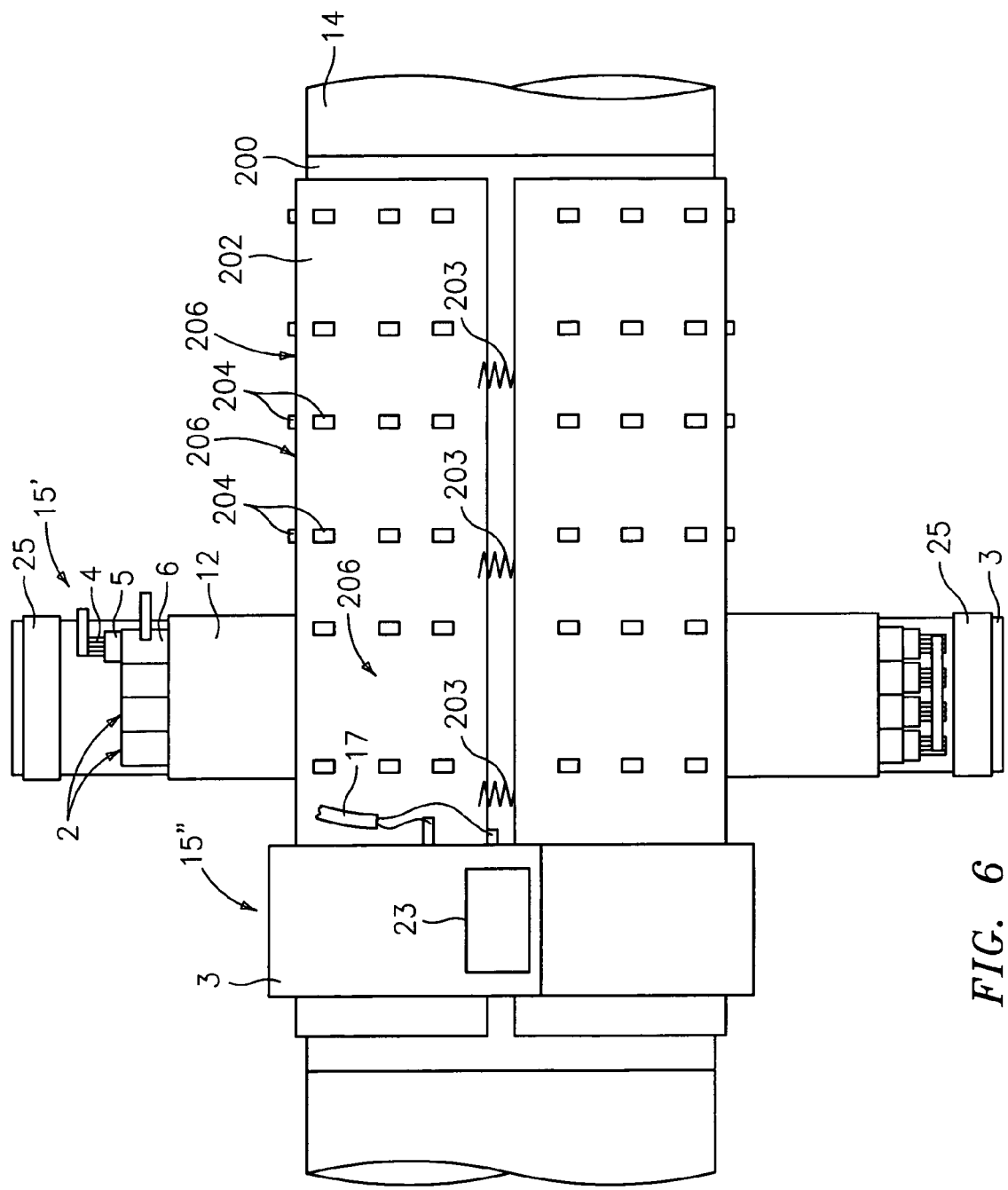
FIG. 6 is a schematic depiction of the array of sensors of FIG. 1 in various stages of installation.

Referring to FIG. 6, the array 11 of sensors 15 is shown in various stages of installation. The installation process begins with cleaning a surface of the section of pipe 14 onto which the sensors 15 are to be installed. This may include removing any debris on the pipe 14 to provide a smooth surface for receiving the sensors 15. A sheet or coating of electrically insulative material 200 is then applied around the pipe 14. For example, a sheet of Kapton® polymide, commercially available from E. I. du Pont de Nemours and Company of Wilmington, Del., may be used.

Next, a protective sheet 202 is wrapped around the pipe 14, over the electrically insulative material 200, and secured in place. The protective sheet 202 may be secured in place using springs or clamps 203 extending between the ends of the protective sheet 202. The electrically insulative material 200 extends continuously beneath the protective sheet 202 and protrudes from the ends of the protective sheet 202 for providing electrical insulation between the protective sheet 202 and the pipe 14.

The protective sheet 202 may be formed from a rigid material (e.g., metals, plastics, polymers etc.) that can be wrapped around the pipe 14. As best seen in FIG. 6, the protective sheet 202 includes a plurality of spaced-apart tabs 204 protruding therefrom in a direction away from the pipe 14. The tabs 204 define sides of raceways 206, which extend circumferentially around the pipe 14 (substantially perpendicular to the pipe axis) for receiving the sensors 15. One raceway 206 is provided for each sensor 15 to be installed. The tabs 204 maintain the desired sensor 15 location and spacing during assembly and operation. In addition, the protective sheet 202 protects the sensors 15 from heat, moisture, and other adverse conditions that may be associated with the pipe 14.

Once the protective sheet 202 is in place, each sensor 15 is aligned with a raceway 206 (as indicated at 15'). The sensor 15 is then wrapped around the protective sheet 202, and the fastener 23 is tightened to secure the sensor 15 in place (as indicated at 15"). After all of the sensors 15 have been installed, the springs or clamps 203 may be removed. The terminal cables 17 from each of the sensors 15 may be mechanically secured to a convenient structure, and the cables 17 are electrically connected to a signal processor (described hereinafter) or to other associated electronics (e.g., a charge amplifier for impedance conversion of the output signals from the sensors 15), which are in turn coupled to the signal processor.

It is contemplated that the sensors 15 may be mounted, attached or clamped directly onto the outer surface of the pipe 14, without the use of the protective sheet 202 or electrically insulative material 200. Alternatively, either the protective sheet 202 or electrically insulative material 200 may be used alone.

Figure 7:
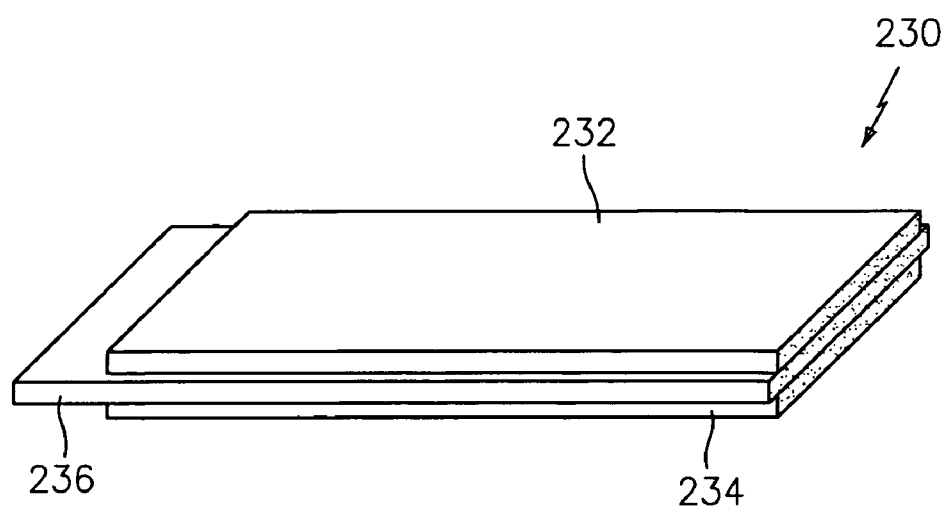
FIG. 7 is a side perspective view of a piezoelectric sensor sheet.

One advantage of the present invention is that the array 11 of sensors 15 is non-invasive, which allows the array 11 to be installed on the pipe 14 without having to remove the pipe 14 from service. Furthermore, the sensors 15 can be prefabricated, with the installation process simply requiring that the sensors 15 (and, perhaps, the insulative material 200 and/or protective sheet 202) be wrapped around the pipe and secured. Another advantage of the present invention is that the sensors 15 of the design described herein can be adapted to many different pipe diameters by simply lengthening or shortening the cables 2 and bands 3. Yet another advantage of the present invention is that it eliminates the need for using an adhesive to affix the piezoelectric material to the pipe. For example, FIG. 7 shows a PVDF sensor sheet 230 that includes one electrode 232 adhered on one side, another electrode 234 adhered on another side, and PVDF material 236 disposed between the electrodes 232, 234. The PVDF sheet 230 may also include an insulative material (not shown) disposed on either side of the electrodes 232 which may, in turn, be adhered to a pipe (not shown), similar to that described in U.S. patent application Ser. Nos. 10/712,818 filed Nov. 12, 2003, and 10/712,833 filed Nov. 12, 2003, which are both incorporated by reference herein.

While the arrangement of FIG. 7 works well for lower temperature applications, the use of adhesives to affix the piezoelectric material 236 to the electrodes 232, 234 and/or pipe may limit the temperatures under which the PVDF sheet 230 may be used. More specifically, PVDF material 236 is made piezoactive by stretching the material to form the β (piezoactive) phase. High temperatures release the β phase and shrink the PVDF material 236 along the stretch direction. Under lower temperatures, adhesives are effective in preventing the PVDF material 236 from shrinking. However, when certain high temperatures are reached, adhesives have been found to be unsuccessful at resisting this shrinkage, with a resulting drop in sensitivity of the PVDF sheet 230.

It has been found that the cable 2 used in the sensor 15 of the present invention "locks" piezoelectric material 5 in place between the inner and outer conductors 4, 6. The helical wrap of the piezoelectric material 5 around the inner conductor 4 prevents the piezoelectric material 5 from constricting beyond the diameter of the inner conductor 4. Thus the temperature excursions "lock" the piezoelectric material 5 in place, preserving the beta phase, and providing long-term stability. As a result, the cable 2 has the ability to function under higher temperatures without degradation over time.

While the PVDF sheet 230 of FIG. 7 may be processed to make it less susceptible to these effects, such processing is costly. The sensor 15 of the present invention is therefore less costly to implement. The cable 2 in the sensor 15 can be spooled off and cut to a desired length. The cable 2 does not require screen printed or otherwise adhered electrodes, which would have to be sized for a specific pipe diameter, and is therefore less expensive, more versatile and more readily available.

Furthermore, it is believed that approaches using the PVDF sheet 230 of FIG. 7 adhered to a pipe are less sensitive, by a factor of at least 10, at measuring conduit dynamic pressures when compared to the sensor 15 of the present invention. While not wanting to be bound by theory, it is believed that the increased sensitivity of the sensor 15 can be explained by noting that, while both the PVDF sheet 230 of FIG. 7 and the cable 2 of the present invention are subjected to longitudinal (i.e., stretching) strains caused by the displacement of the pipe, the cable 2 is also sensitive to radial strains. The radial strains result from the interference between the outer pipe wall and the radial stiffness of the inner conductor 4, which is further enhanced with the addition of the outer band 3.

Figure 8:
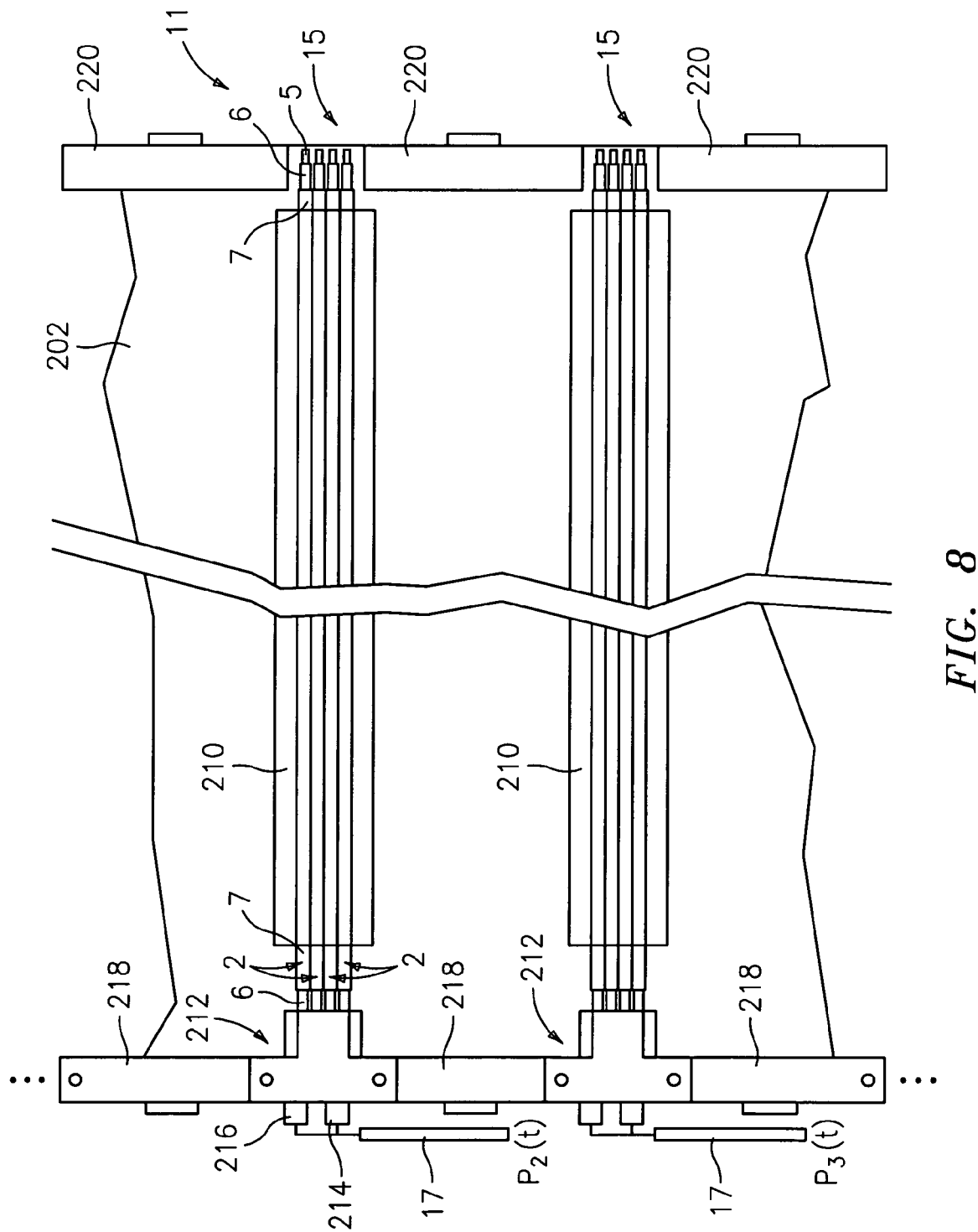
FIG. 8 is a schematic depiction of a spatial array of piezocable based sensors for measuring unsteady pressures inside a pipe, in accordance with another embodiment of the present invention.

Referring to FIG. 8, a portion of an array 11 of piezocable based sensors 15 for measuring unsteady pressures inside a pipe 14 in accordance with another embodiment of the invention is shown. In this embodiment, each sensor 15 is preassembled onto the protective sheet 202, which is then wrapped around the pipe 14. As in the previous embodiment, each sensor 15 includes a plurality of piezoelectric cables 2, with each cable 2 including: an inner (first) electrical conductor 4 (FIG. 9), a piezoelectric material 5 disposed around the inner electrical conductor 4, and an outer (second) electrical conductor 6 disposed around the piezoelectric material 5. In this embodiment, each cable 2 preferably has a jacket 7 of dielectric material disposed around the outer conductor to electrically isolate the outer conductor from the protective sheet. For example, the ribbon of cables 2 depicted in FIG. 2 may be used. The cables 2 in each sensor 15 are effectively electrically connected in parallel.

The cables 2 are adhered to the protective sheet by a strip of tape 210 (e.g Kapton® polymide tape). One end of each of the cables 2 is electrically connected to a terminal assembly 212. The terminal assembly 212 includes upper and lower terminals 214 and 216, each of which are formed by plates of electrically conductive material (e.g., copper). The upper and lower terminals 214 and 216 make electrical contact with the outer and inner electrical conductors 6 and 4, respectively. The terminal assembly 212 provides an electrical connection between the inner and outer conductors 4, 6 of each cable 2 and a non-piezoelectric terminal cable 17, such as a low noise coaxial cable. Each terminal cable 17 conducts a respective signal $P_1(t) \ldots P_N(t)$ indicative of unsteady pressure within the pipe 14 to electronic circuitry associated with the array 11 of sensors 15, as will be described in further detail hereinafter.

Each terminal assembly 212 is mechanically fastened to stiffening members 218, which are, in turn, mechanically fastened to the protective sheet 202. The stiffening members 218 may be formed from rigid plates (e.g., steel plates), which extend between terminal assemblies 212 proximate an edge of the protective sheet 202 to stiffen the assembled array 11. Similar stiffening members 220 are also secured to the protective sheet 202 proximate an opposite edge of the protective sheet 202. An end of each cable 2 proximate stiffening members 220 is preferably left unattached to the protective sheet 202 to prevent an overly constrained system.

Figure 9:
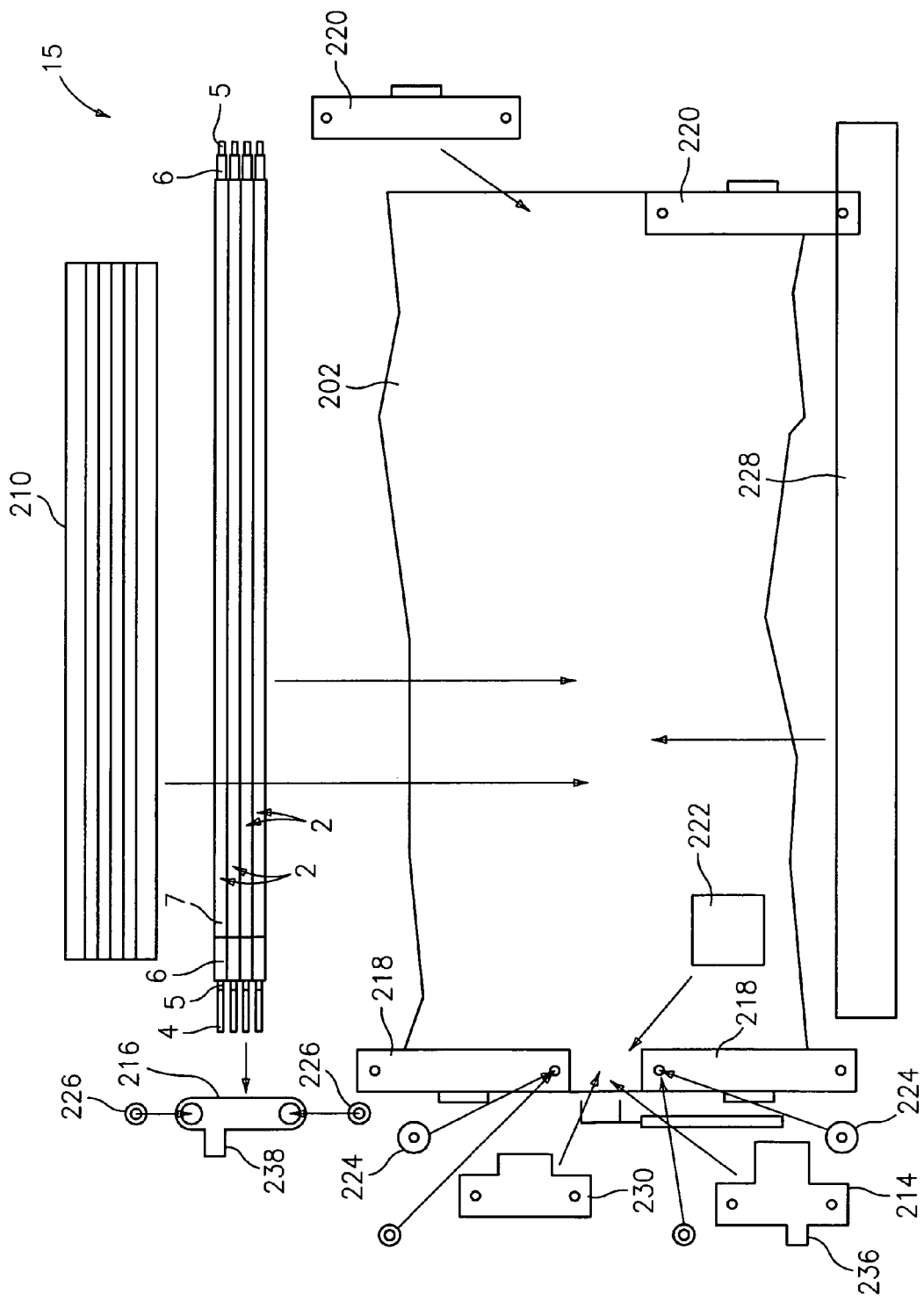
FIG. 9 is an exploded plan view of a sensor in the array of FIG. 8.
Figure 10:
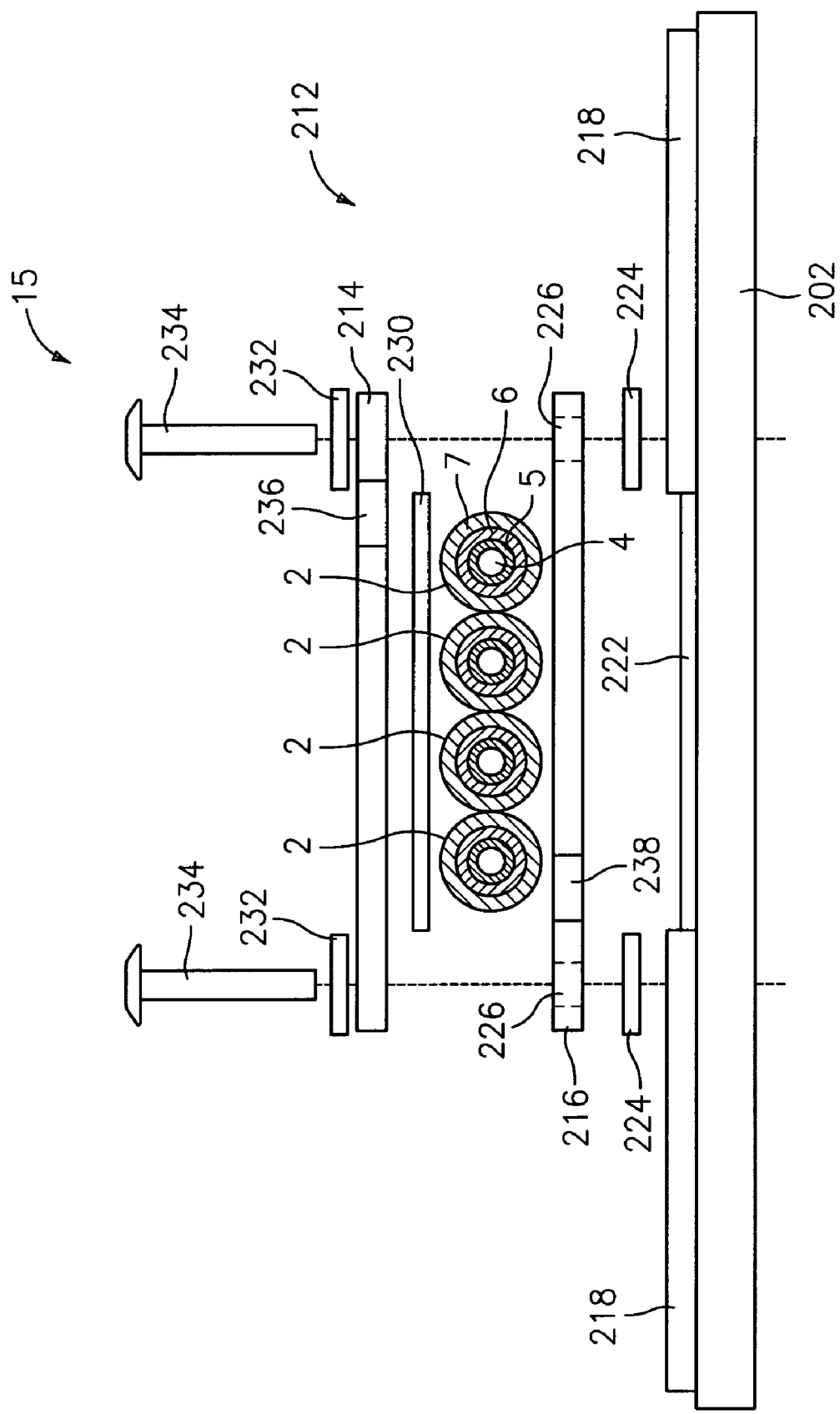
FIG. 10 is an exploded elevation view of the sensor in the array of FIG. 8.

FIG. 9 is an exploded plan view of one sensor 15 shown in FIG. 8, and FIG. 10 is an exploded elevation view of the portion of the sensor 15. Referring to FIGS. 9 and 10, each sensor 15 is assembled by first attaching the stiffening members 218 and 220 to the protective sheet 202 using rivets, bolts, welds, and the like. Next, a strip of electrically insulative tape 222 (e.g Kapton® polymide tape) is adhered to the protective sheet 202 to electrically isolate the lower terminal 216 from the protective sheet 202. An exposed portion of the inner conductor 4 of each cable 2 is electrically connected to the lower terminal 216 by way of soldering, ultrasonic welding, or the like. Next, electrically insulative washers 224 are disposed between the lower terminal 216 and the stiffening members 218, and electrically insulative washers 226 are disposed within apertures formed in the lower terminal 216. The lower terminal 216 is then placed on the stiffening members 218, above the washers 224 and strip of electrically insulative tape 222. Double sided tape 228 may be disposed between the cables 2 and the protective sheet 202 to aid in assembly. A strip of electrically insulative material 230 (e.g., Kapton® polymide) is placed over the exposed portion of the inner conductors 4, and the upper terminal 214 is placed on top of the electrically insulative material 230 and into contact with an exposed portion of the outer conductor 6. Next, a pair of electrically insulative washers 232 are placed over apertures formed in the upper terminal 214, and a pair of rivets 234 are disposed through the washers 232, upper terminal 214, lower terminal 216, washers 224 and 226, stiffening members 218, and protective sheet 202 to attach the terminal assembly 212 to the stiffening members 218 and protective sheet 202. Finally, the terminal cable 17 is electrically connected (e.g., soldered) to tabs 236 and 238 on the upper and lower terminals 214 and 216, respectively.

Figure 11:
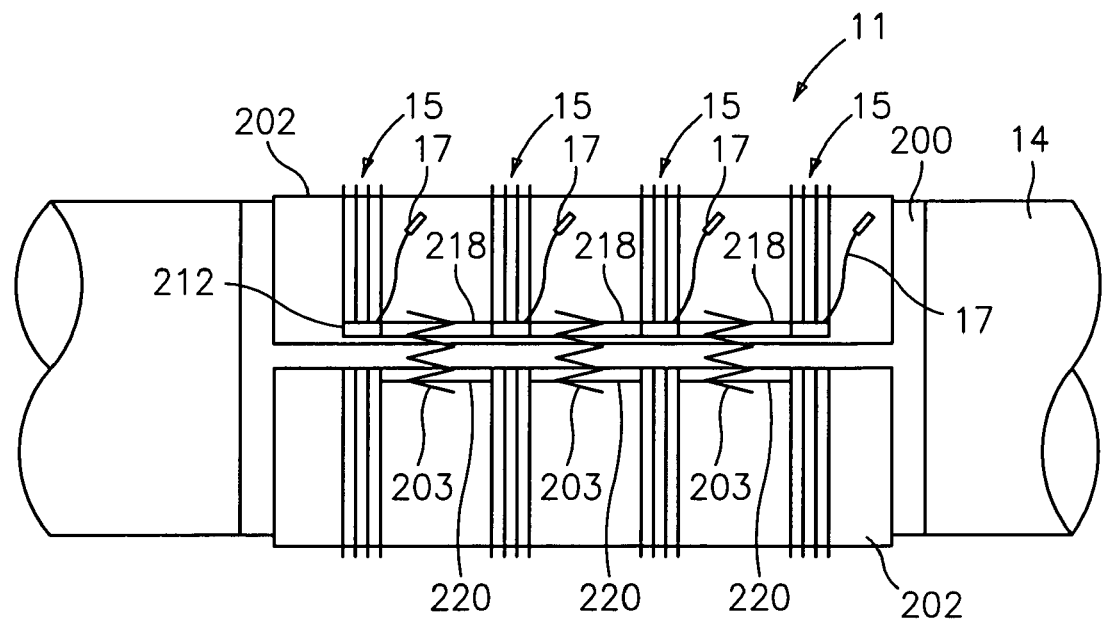
FIG. 11 is a schematic depiction of the array of FIG. 8 in one stage of installation onto a pipe.

Referring to FIG. 11, installation of the array 11 onto the pipe 14 begins with cleaning a surface of the section of pipe 14 onto which the array 11 is to be installed. This may include removing any debris on the pipe 14 to provide a smooth surface for receiving the array 11. A sheet or coating of electrically insulative material 200 (e.g., Kapton® polymide) may then be applied around the pipe 14.

Next, the protective sheet 202 with the attached array 11 is wrapped around the pipe 14, over the electrically insulative material 200, as shown in FIG. 11. The protective sheet 202 may be secured in place using springs or clamps 203 extending between the ends of the protective sheet 202. The electrically insulative material 200 extends continuously beneath the protective sheet 202 and protrudes from the ends of the protective sheet 202 for providing electrical insulation between the protective sheet 202 and the pipe 14.

Figure 12:
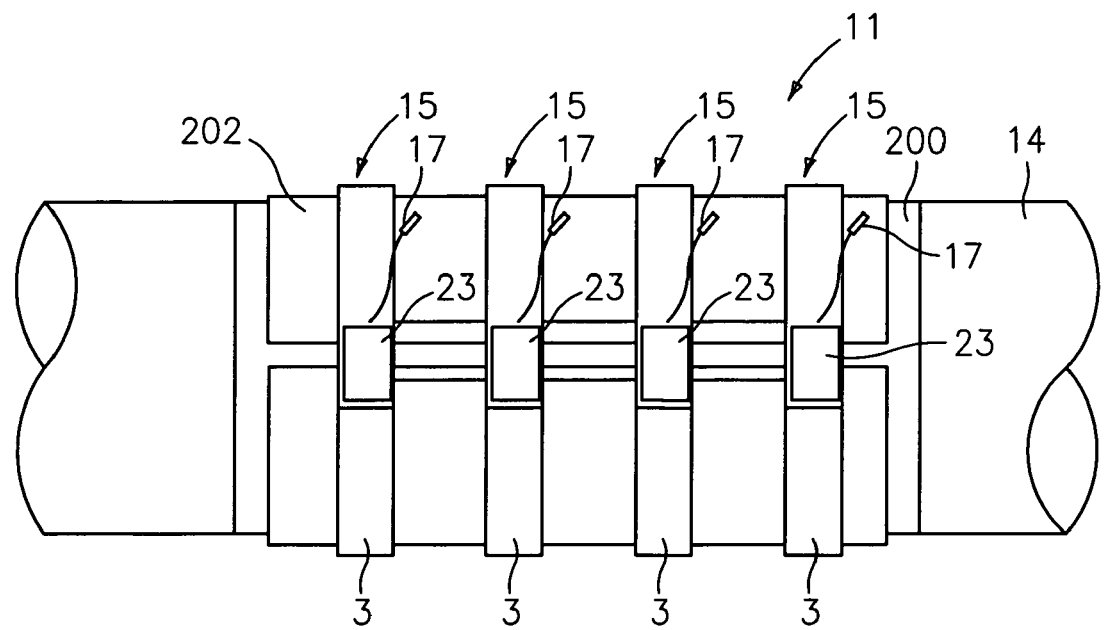
FIG. 12 is a schematic depiction of the array of FIG. 8 installed on a pipe.

After the protective sheet 202 and array 11 are attached, bands 3 are wrapped around each sensor 15, as shown in FIG. 12. The ends of each band 3 are releasably attached together by a fastener 23 comprising a screw mechanism similar to that of a typical hose clamp. The bands 3 are tightened to compress the plurality of cables 2 (FIG. 8) toward the pipe 14. After all of the bands 3 have been installed, the springs or clamps 203 may be removed. The terminal cables 17 from each of the sensors 15 may be mechanically secured to a convenient structure, and the cables 17 are electrically connected to a signal processor (described hereinafter) or to other associated electronics (e.g., a charge amplifier for impedance conversion of the output signals from the sensors 15), which are in turn coupled to the signal processor.

The embodiment of FIGS. 8-12 has the same advantages as those described with respect to the previous embodiments. Furthermore, the embodiment of FIGS. 8-12 has the added advantage that the entire array 11 may be assembled prior to installation. Thus, the installation process simply requires that the protective sheet 202 with attached array 11 (and, perhaps, the insulative material 200) be wrapped around the pipe 14 and secured into place with the bands 3.

Figure 13:
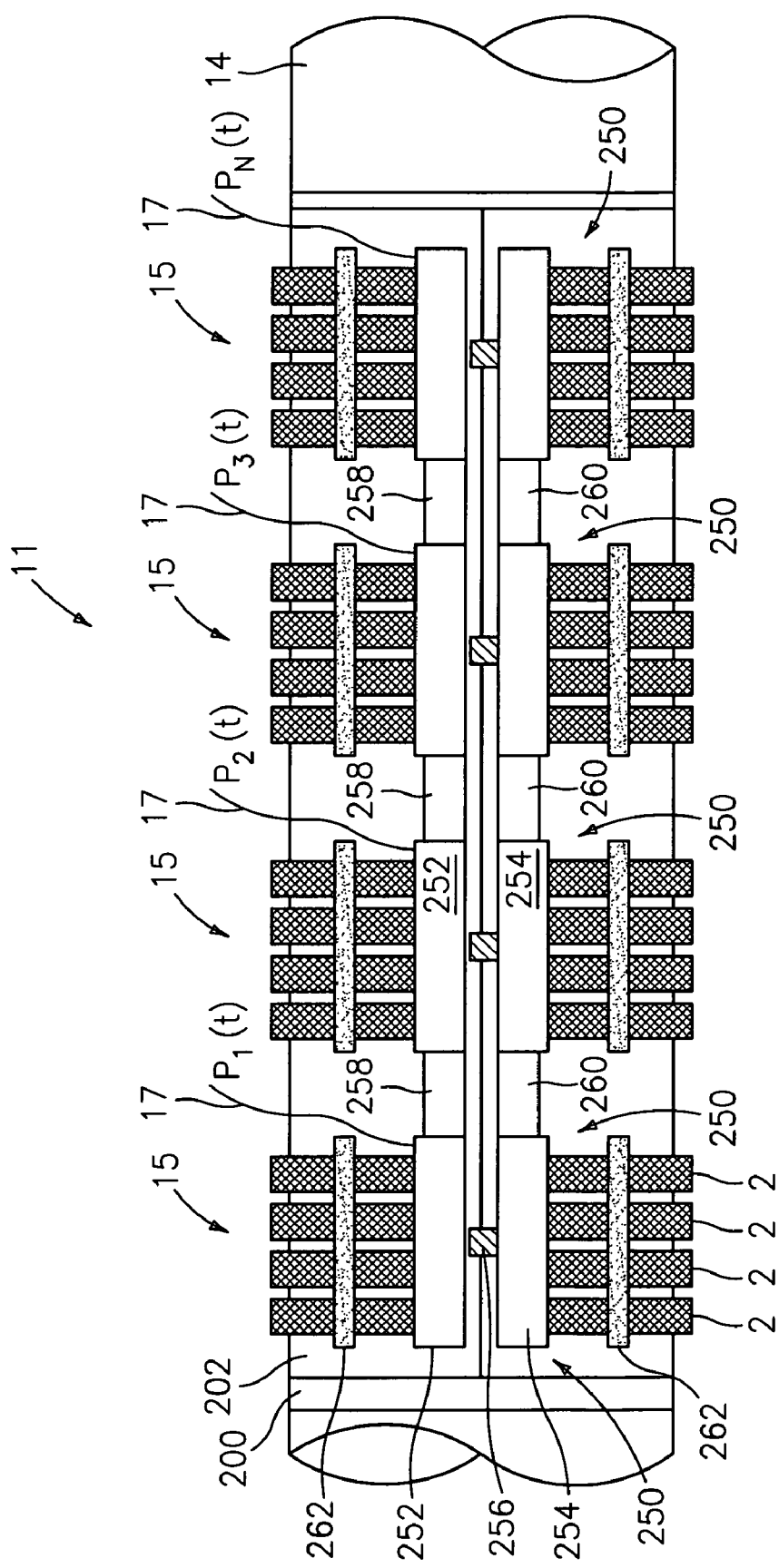
FIG. 13 is a schematic depiction of a spatial array of piezocable based sensors for measuring unsteady pressures inside a pipe, in accordance with another embodiment of the present invention.

Referring to FIG. 13, an array 11 of piezocable based sensors 15 in accordance with another embodiment of the present invention is shown. In this embodiment, each of the sensors 15 includes a clamp 250 attached to opposing ends of each cable 2. The clamp 250 applies a load to opposing ends of each cable 2 in the sensor 15 to hold the cables 15 in tension around the pipe 14. The clamp 250 may include a first block 252 attached to a first end of each cable 2 in the sensor 15 and a second block 254 attached to a second end of each cable 2 in the sensor 15. The first block 252 is secured to the second block 254 by a fastener 256, wherein tightening the fastener 256 increases tension of the plurality of cables 2 around the pipe 14.

Each of the first and second blocks 252, 254 may be arranged in a manner similar to the terminal assemblies 212 of FIGS. 8-10, but with the outer and inner conductors 4, 6 of each cable 2 being ultrasonically welded to the upper and lower terminal 214, 216, respectively and with the entire terminal assembly 212 being free from the protective sheet 202. Ultrasonic welding advantageously provides for a strong and creep-free joint between the cable 2 and the terminals 214, 216. Similar to the terminal assemblies 212 of FIGS. 8-10, the terminal cable 17 may be electrically connected to tabs 236, 238 disposed on the upper and lower terminals 214, 216, respectively, such that the terminal assembly 212 provides an electrical connection between the inner and outer conductors 4, 6 of each cable 2 and the terminal cable 17. The cables 2 in each sensor 15 are effectively electrically connected in parallel. Each terminal cable 17 conducts a respective signal $P_1(t) \ldots P_N(t)$ indicative of unsteady pressure within the pipe 14 to electronic circuitry associated with the array 11 of sensors 15, as will be described in further detail hereinafter.

Disposed between adjacent first blocks 252 in the spatial array 11 of sensors 15 are beams 258, which act to couple the adjacent first blocks 252 and maintain spacing between the first blocks 252. Similarly, disposed between adjacent second blocks 254 in the spatial array 11 of sensors 15 are beams 260, which act to couple the adjacent second blocks 254 and maintain spacing between the second blocks 254. Extending between cables 2 in each of the sensors 15 are a plurality of cable retainers 262, which maintain alignment of the cables 2 in the array 15. While two cable retainers 262 are shown, it will be appreciated that more cable retainers 262 may be distributed along the length of the sensor 15. Using the cable retainers 262 and beams 258, 260, the entire array 11 may be assembled prior to installation.

Installation of the array 11 of FIG. 13 onto the pipe 14 begins with cleaning a surface of the section of pipe 14 onto which the array 11 is to be installed. This may include removing any debris on the pipe 14 to provide a smooth surface for receiving the sensors 15. A sheet or coating of electrically insulative material 200 (e.g., Kapton® polymide) may then be applied around the pipe 14.

Next, a protective sheet 202 may be wrapped around the pipe 14, over the electrically insulative material 200. As previously described, the protective sheet 202 may be temporarily secured in place using springs or clamps extending between the ends of the protective sheet 202. The electrically insulative material 200 extends continuously beneath the protective sheet 202 and protrudes from the ends of the protective sheet 202 for providing electrical insulation between the protective sheet 202 and the pipe 14.

After the protective sheet 202 is attached, the array 11 is wrapped around the protective sheet 202. The first and second blocks 252, 254 are then releasably attached together by the fasteners 256 (which may comprise screw mechanisms). The fasteners 256 are then tightened to increase tension of the plurality of cables 2 around the pipe 14. After the array 11 has been installed, the terminal cables 17 from each of the sensors 15 are mechanically secured to a convenient structure, and the cables 17 are electrically connected to a signal processor (described hereinafter) or to other associated electronics (e.g., a charge amplifier for impedance conversion of the output signals from the sensors 15), which are in turn coupled to the signal processor.

It is contemplated that the array 11 may be mounted directly onto the outer surface of the pipe 14, without the use of the protective sheet 202 or electrically insulative material 200. Alternatively, either the protective sheet 202 or electrically insulative material 200 may be used alone.

The embodiment of FIG. 13 has the same advantages as those described with respect to the previous embodiments. Furthermore, the embodiment of FIG. 13 has the added advantage that the clamp 250 acts to load the cables 2 tangentially around the pipe 14, rather than radially clamping the cables 2 to the pipe 14. Tangential loading results in increased strain efficiency over that possible with radial loading, thus reducing the load on the cable 2 necessary to achieve the same sensitivity to displacement of the pipe 14. The inventors' experience has shown that, for the same sensitivity, the load required for a tangentially-loaded arrangement is about $1/10^{th}$ of the load required for radially-loaded arrangements. With the lower load, the cable 2 is subjected to a lower stress state, which in turn reduces long term creep and relaxation of the cable's polymeric construction. As a result, the cable 2 is able to maintain a high level of sensitivity for longer periods of time than is possible with radial loading. In addition, because lesser loads are necessary to achieve the same sensitivity, the embodiment of FIG. 13 can take advantage of smaller and lighter hardware to achieve these loads, which leads to a further reduction in the load on the cable 2.

Figure 14:
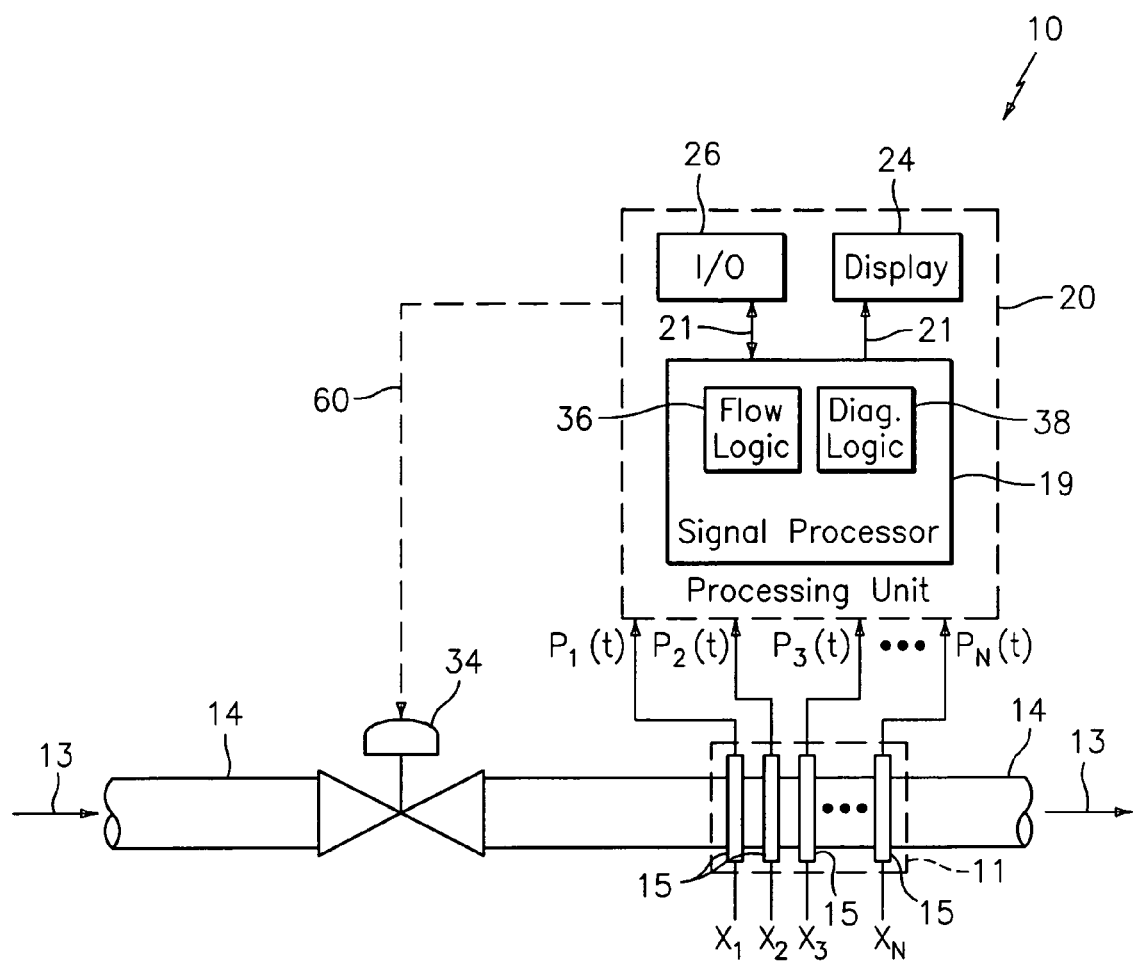
FIG. 14 is a schematic depiction of an apparatus including the spatial array of piezocable based sensors for measuring at least one parameter of a fluid, in accordance with various embodiments of the present invention.

Referring to FIG. 14, the spatial array of sensors 15 from any of the various embodiments described herein is shown as part of an apparatus 10 for measuring at least one parameter of the fluid 13. As described in U.S. patent application Ser. Nos. 10/007,749, 10/349,716, 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process. The fluid 13 may be a single or multiphase fluid flowing through a duct, conduit or other form of pipe 14.

In the array 11, the sensors 15 are disposed at different axial locations $x_1 \ldots x_N$ along the pipe 14. Each of the sensors 15 provides a pressure signal P(t) indicative of unsteady pressure within the pipe 14 at a corresponding axial location $x_1 \ldots x_N$ of the pipe 14. A signal processor 19 receives the pressure signals $P_1(t) \ldots P_N(t)$ from the sensors 15 in the array 11, determines the parameter of the fluid 13 using the pressure sensors 15, and outputs the parameter as a signal (parameter) 21.

While the array 11 is shown as including four sensors 15, it is contemplated that the array 11 may include two or more sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 sensors 15. Generally, the accuracy of the measurement improves as the number of sensors 15 in the array increases. The degree of accuracy provided by the greater number of sensors 15 is offset by the increase in complexity and time for computing the desired output parameter 21 of the fluid 13. Therefore, the number of sensors 15 used is dependent at least on the degree of accuracy desired and the desired update rate of the output parameter 21 provided by the apparatus 10.

The signals $P_1(t) \ldots P_N(t)$ provided by the sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more signal processing devices for executing programmed instructions, such as one or more microprocessors or application specific integrated circuits (ASICS), and may include memory for storing programmed instructions, set points, parameters, and for buffering or otherwise storing data.

The pressure signals $P_1(t) \ldots P_N(t)$ provided by each respective sensor 15 are processed by the signal processor 19, which applies this data to flow logic 36 executed by the signal processor 19 to determine the one or more parameters 21 associated with the fluid 13, such as volumetric flow rate, mass flow rate, density, composition, entrained air, consistency, particle size, velocity, mach number, speed of sound propagating through the fluid, and/or other parameters of the fluid 13. The flow logic 36 is described in further detail hereinafter.

The signal processor 19 may also apply one or more of the pressure signals $P_1(t) \ldots P_N(t)$ and/or one or more parameters 21 from the flow logic 36 to diagnostic logic 38. Diagnostic logic 38 is executed by signal processor 19 to diagnose the health of any device 34 in the process flow that causes unsteady pressures to be generated in the section of the pipe 14 where the array 11 of sensors 15 are disposed. In FIG. 14, device 34 is depicted as a valve; however, it is contemplated that device 34 may be any machinery, component, or equipment, e.g. motor, fan, pump, generator, engine, gearbox, belt, drive, pulley, hanger, clamp, actuator, valve, meter, or the like. The signal processor 19 may output one or more parameters indicative of the health of the diagnosed device 34. The diagnostic logic 38 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the array 11 by a flexible cable, wireless connection, or the like. The flexible cable may also be used to provide operating power from the processing unit 20 to the array 11 if necessary.

Diagnostic Logic

Figure 15:
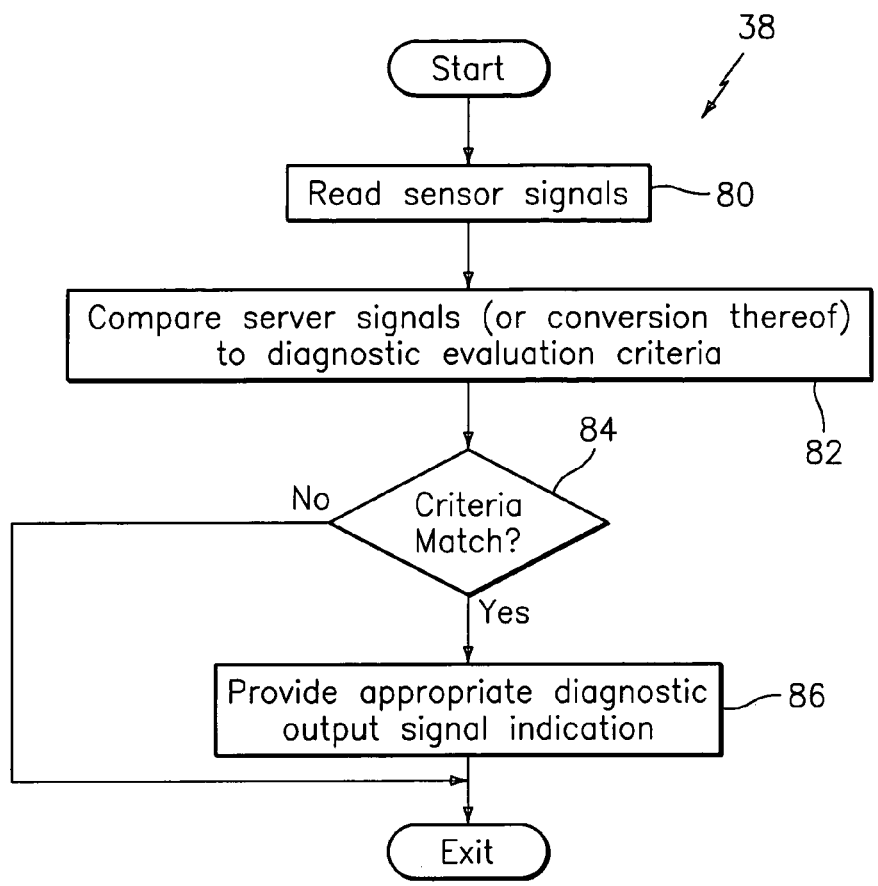
FIG. 15 is a block diagram of a diagnostic logic used in the apparatus of the present invention.

Referring to FIG. 15 the diagnostic logic 38 measures the sensor input signals (or evaluation input signals), which may include one or more of the signals $P_1(t), P_2(t), P_3(t), \ldots P_N(t)$ and the parameters 21, at a step 80. Next, the diagnostic logic 38 compares the evaluation input signals to a diagnostic evaluation criteria at a step 82, discussed hereinafter. Then, a step 84 checks if there is a match, and if so, a step 86 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like. If there is not a criteria match in step 84, the diagnostic logic 38 exits.

Where the evaluation input signal includes one or more signals $P_1(t)$, $P_2(t)$, $P_3(t)$, ... $P_N(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array 11 may be processed in any domain, including the frequency/spatial domain, the temporal/spatial domain, the temporal/wave-number domain, or the wave-number/frequency (k–ω) domain or other domain, or any combination of one or more of the above. As such, any known array processing technique in any of these or other related domains may be used if desired.

For example, for three unsteady pressure signals, the equations in the frequency/spatial domain equation would be:

$$P(x,\omega) = Ae^{-ik_r x} + Be^{+ik_l x};$$

the temporal/spatial domain would be:

$$P(x,t) = (Ae^{-ik_r x} + Be^{+ik_l x})e^{i\omega t};$$

and the k–ω domain (taking the spatial Fourier transform) would be $$P(k,\omega) = \frac{1}{2\pi}\int_{-\infty}^{+\infty} P(x,\omega)e^{ikx}\,dx$$
$$= A(\omega)\delta\left(k - \frac{\omega}{a}\right) + B(\omega)\delta\left(k + \frac{\omega}{a}\right)$$

where k is the wave number, α is the speed of sound of the material, x is the location along the pipe, ω is frequency (in rad/sec, where ω=2πf), and δ is the Dirac delta function, which shows a spatial/temporal mapping of the acoustic field in the k–ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 16:
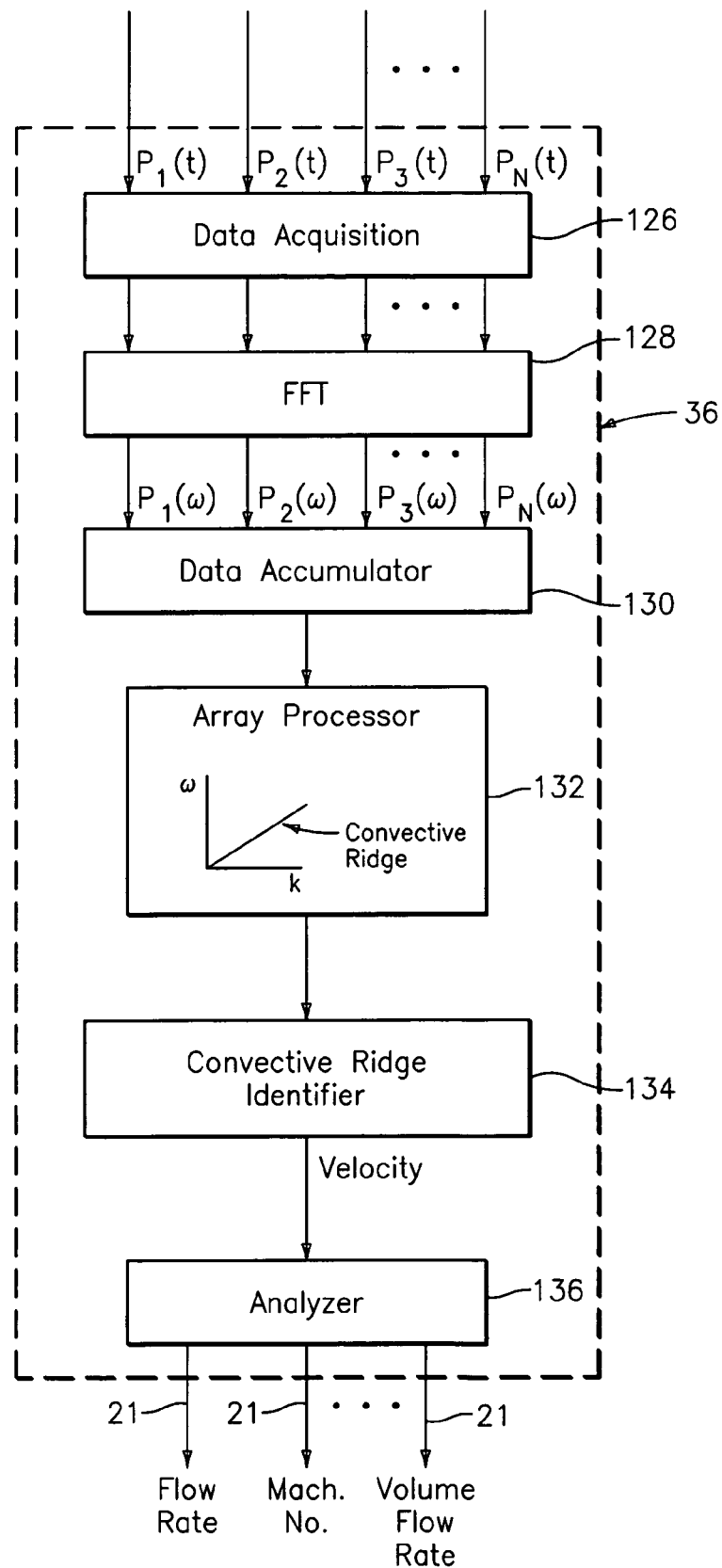
FIG. 16 is a block diagram of a first embodiment of a flow logic used in the apparatus of the present invention.
Figure 17:
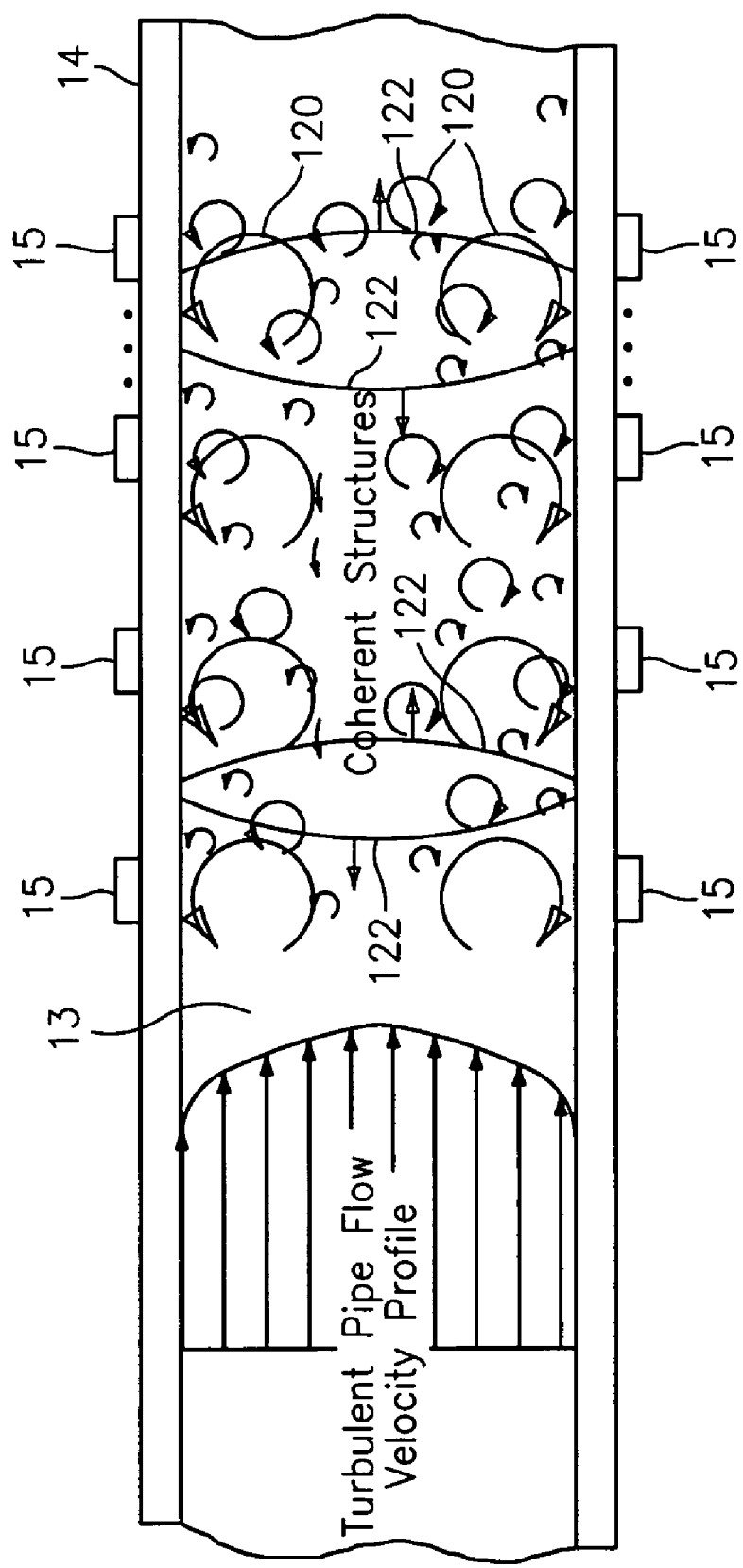
FIG. 17 is a cross-sectional view of a pipe having coherent structures therein.

Referring to FIG. 16, an example of flow logic 36 is shown. As previously described, the array 11 of at least two sensors 15 located at two locations $x_1, x_2$ axially along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at locations $x_1 \ldots x_N$. The pressure generated by the convective pressure disturbances (e.g., eddies 120, see FIG. 17) may be measured through strained-based sensors 15 and/or pressure sensors 15. The sensors 15 provide analog pressure time-varying signals $P_1(t), P_2(t), P_3(t) \ldots P_N(t)$ to the signal processor 19, which in turn applies these signals $P_1(t), P_2(t), P_3(t), \ldots P_N(t)$ to the flow logic 36.

The flow logic 36 processes the signals $P_1(t), P_2(t), P_3(t), \ldots P_N(t)$ to first provide output signals (parameters) 21 indicative of the pressure disturbances that convect with the fluid (process flow) 13, and subsequently, provide output signals (parameters) 21 in response to pressure disturbances generated by convective waves propagating through the fluid 13, such as velocity, Mach number and volumetric flow rate of the process flow 13.

The signal processor 19 includes data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application Ser. No. 10/007,736 and U.S. patent application Ser. No. 09/729,994, filed Dec. 4, 2000, now U.S. Pat. No. 6,609,069, which are incorporated herein by reference.

A data accumulator 130 accumulates the frequency signals $P_1(\omega)-P_N(\omega)$ over a sampling interval, and provides the data to an array processor 132, which performs a spatial-temporal (two-dimensional) transform of the sensor data, from the xt domain to the k–ω domain, and then calculates the power in the k–ω plane, as represented by a k–ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by k=2π/λ where λ is the wavelength of a spectral component, and corresponding angular frequencies given by ω=2πν.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k–ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k–ω plane, as represented by a k–ω plot (see FIG. 18) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 15.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters.

Figure 18:
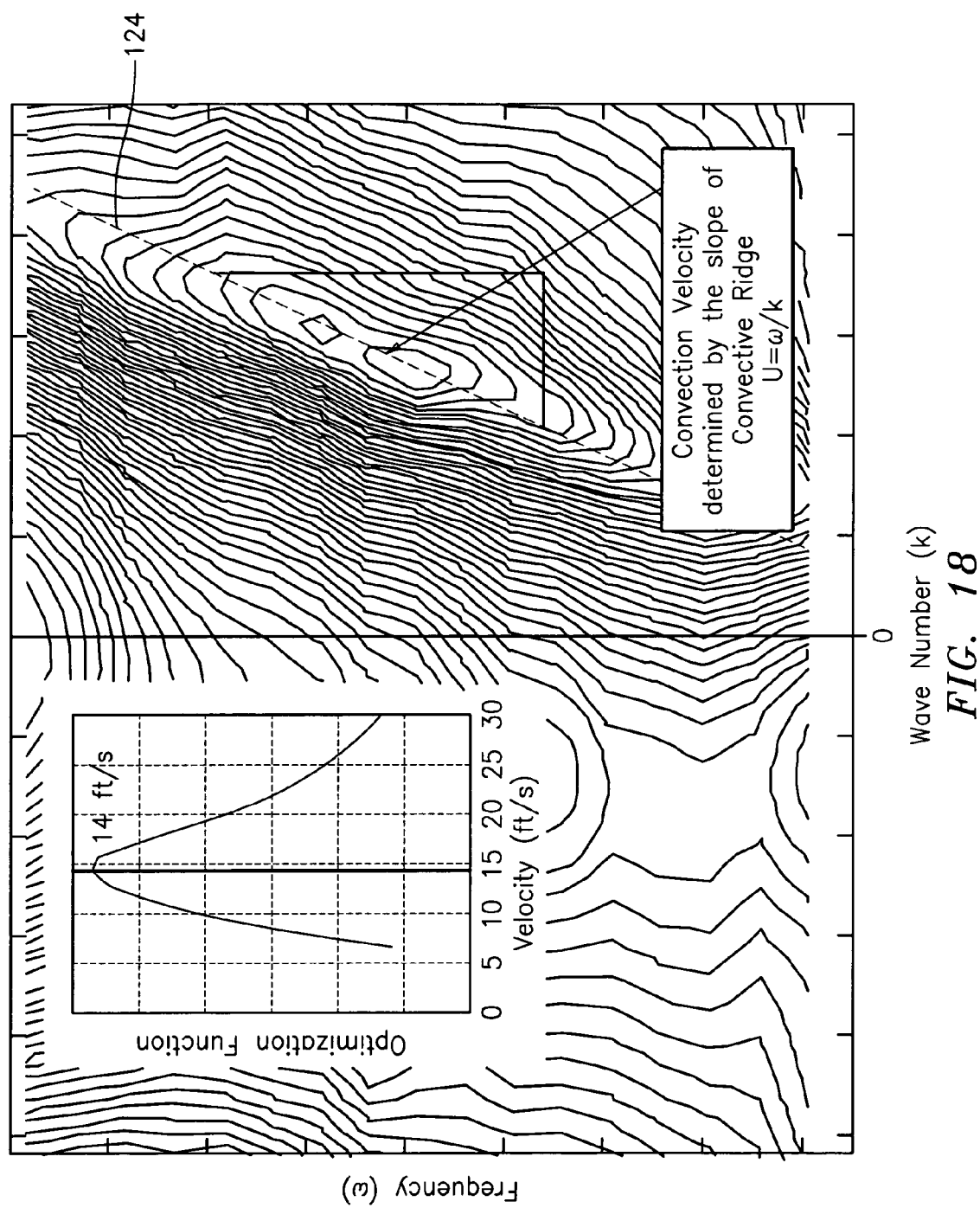
FIG. 18 a kω plot of data processed from an apparatus embodying the present invention that illustrates slope of the convective ridge, and a plot of the optimization function of the convective ridge.

In the case of suitable turbulent eddies 120 (see FIG. 17) being present, the power in the k–ω plane shown in a k–ω plot of FIG. 18 shows a convective ridge 124. The convective ridge represents the concentration of a stochastic parameter that convects with the flow and is a mathematical manifestation of the relationship between the spatial variations and temporal variations described above. Such a plot will indicate a tendency for k–ω pairs to appear more or less along a line 124 with some slope, the slope indicating the flow velocity.

Once the power in the k–ω plane is determined, a convective ridge identifier 134 uses one or another feature extraction method to determine the location and orientation (slope) of any convective ridge 124 present in the k–ω plane. In one embodiment, a so-called slant stacking method is used, a method in which the accumulated frequency of k–ω pairs in the k–ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by k=ω/u, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 19:
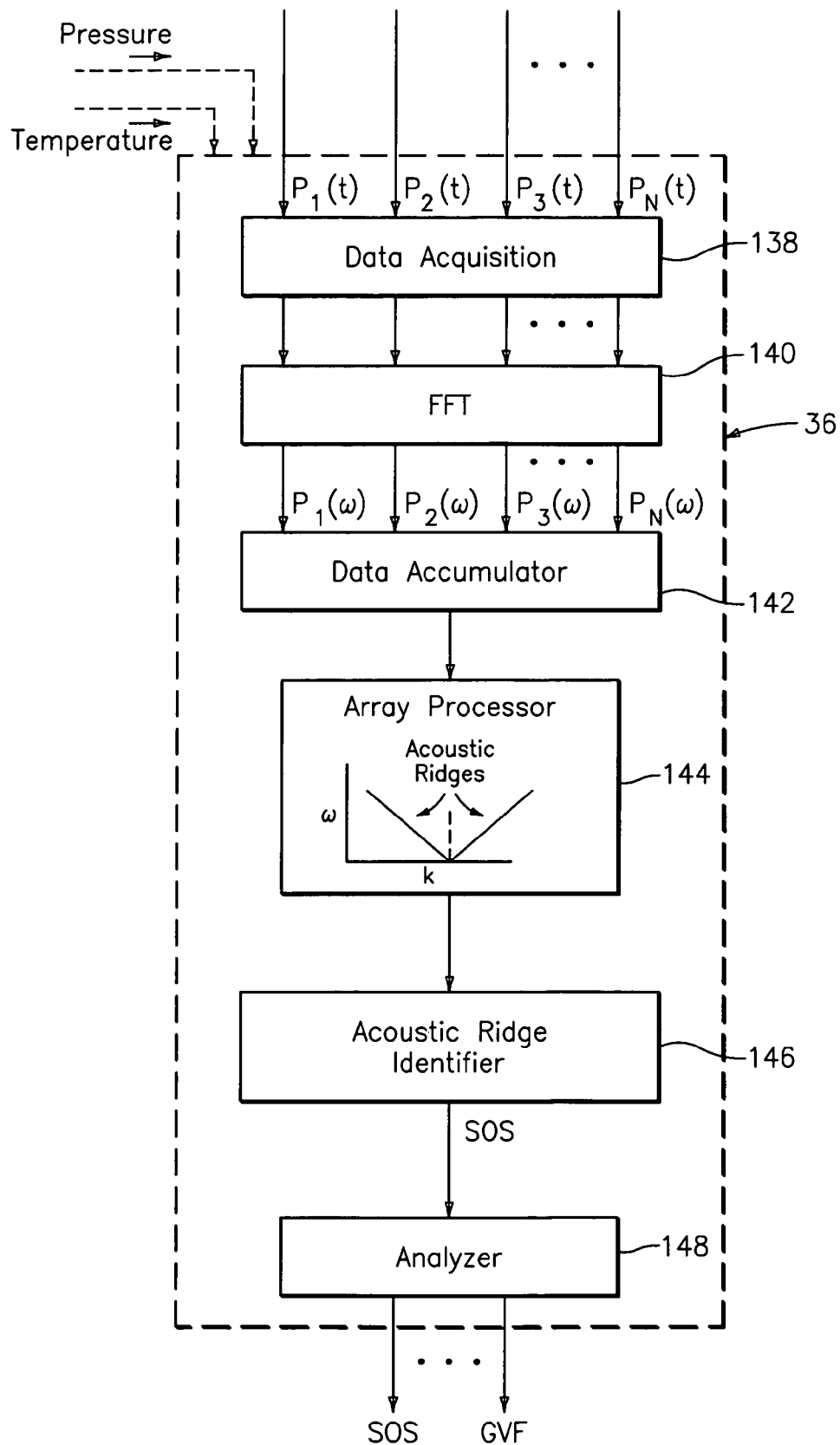
FIG. 19 is a block diagram of a second embodiment of a flow logic used in the apparatus of the present invention.

Referring to FIG. 19, another example of flow logic 36 is shown. While the examples of FIG. 16 and FIG. 19 are shown separately, it is contemplated that the flow logic 36 may perform all of the functions described with reference to FIG. 16 and FIG. 19. As previously described, the array 11 of at least two sensors 15 located at two at least two locations $x_1,x_2$ axially along the pipe 14 sense respective stochastic signals propagating between the sensors within the pipe at their respective locations. Each sensor 15 provides a signal indicating an unsteady pressure at the location of each sensor 15, at each instant in a series of sampling instants. One will appreciate that the sensor array 11 may include more than two pressure sensors 15 distributed at locations $x_1 \ldots x_N$. The pressure generated by the acoustic pressure disturbances (e.g., acoustic waves 122, see FIG. 17) may be measured through strained-based sensors and/or pressure sensors. The sensors 15 provide analog pressure time-varying signals $P_1(t),P_2(t),P_3(t), \ldots P_N(t)$ to the flow logic 36. The flow logic 36 processes the signals $P_1(t),P_2(t),P_3(t), \ldots P_N(t)$ from the sensors 15 to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The signal processor 19 receives the pressure signals from the array 11 of sensors 15. A data acquisition unit 138 digitizes the pressure signals $P_1(t) \ldots P_N(t)$ associated with the acoustic waves 122 propagating through the pipe 14. Similarly to the FFT logic 128 of FIG. 16, an FFT logic 140 calculates the Fourier transform of the digitized time-based input signals $P_1(t) \ldots P_N(t)$ and provides complex frequency domain (or frequency based) signals $P_1(\omega),P_2(\omega),P_3(\omega), \ldots P_N(\omega)$ indicative of the frequency content of the input signals.

A data accumulator 142 accumulates the frequency signals $P_1(\omega) \ldots P_N(\omega)$ over a sampling interval, and provides the data to an array processor 144, which performs a spatial-temporal (two-dimensional) transform of the sensor data, from the xt domain to the k–ω domain, and then calculates the power in the k–ω plane, as represented by a k–ω plot.

To calculate the power in the k–ω plane, as represented by a k–ω plot (see FIG. 20) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15.

Figure 20:
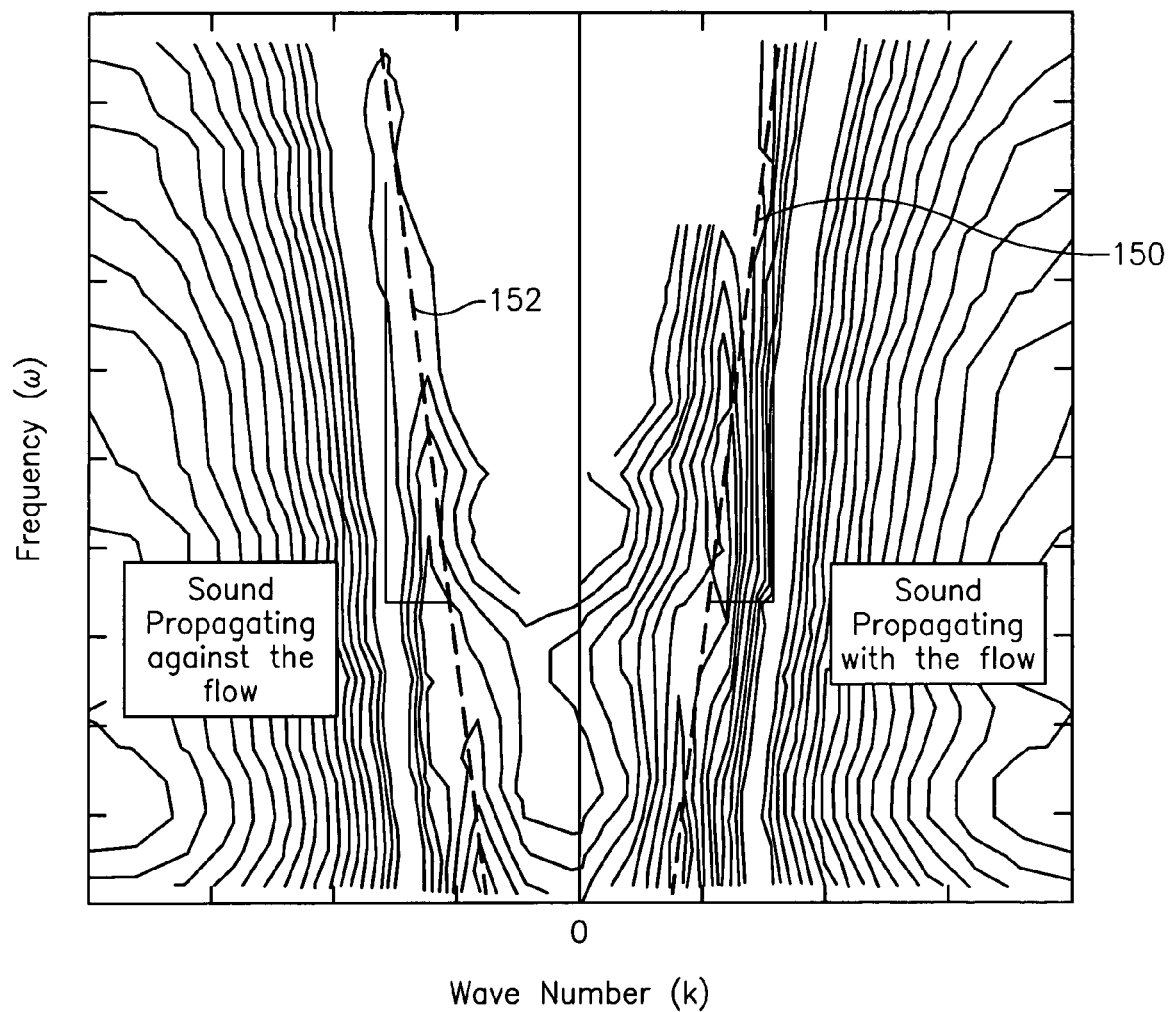
FIG. 20 a kω plot of data processed from an apparatus embodying the present invention that illustrates slope of the acoustic ridges.

In the case of suitable acoustic waves 122 being present in both axial directions, the power in the k–ω plane shown in a k–ω plot of FIG. 20 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k–ω pairs to appear more or less along a line 150, 152 with some slope, the slope indicating the speed of sound.

The power in the k–ω plane so determined is then provided to an acoustic ridge identifier 146, which uses one or another feature extraction method to determine the location and orientation (slope) of any acoustic ridge present in the left and right k–ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 16, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by k=2π/λ where λ is the wavelength of a spectral component, and corresponding angular frequencies given by ω=2πν.

One such technique of determining the speed of sound propagating through the process flow 13 is using array processing techniques to define an acoustic ridge in the k–ω plane as shown in FIG. 20. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 15 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2 + Bx + C = 0$$

wherein x is the speed of sound, $A = 1 + rg/rl*(K_{eff}/P - 1) - K_{eff}/P$, $B = K_{eff}/P - 2 + rg/rl$; $C = 1 - K_{eff}/rl*a_{meas}^2)$; Rg=gas density, rl=liquid density, $K_{eff}$=effective K (modulus of the liquid and pipewall), P=pressure, and $a_{meas}$=measured speed of sound.

Effectively, $$\text{Gas Voulume Fraction}(GVF) = (-B + \text{sqrt}(B^2 - 4*A*C))/(2*A)$$

Alternatively, the sound speed of a mixture can be related to volumetric phase fraction ($\phi_i$) of the components and the sound speed (a) and densities (ρ) of the component through the Wood equation.

$$\frac{1}{\rho_{mix} a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{1/a_{mix\infty}^2 + \rho_{mix}\frac{2R}{Et}}} \quad (\text{eq 1})$$

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas.

Figure 21:
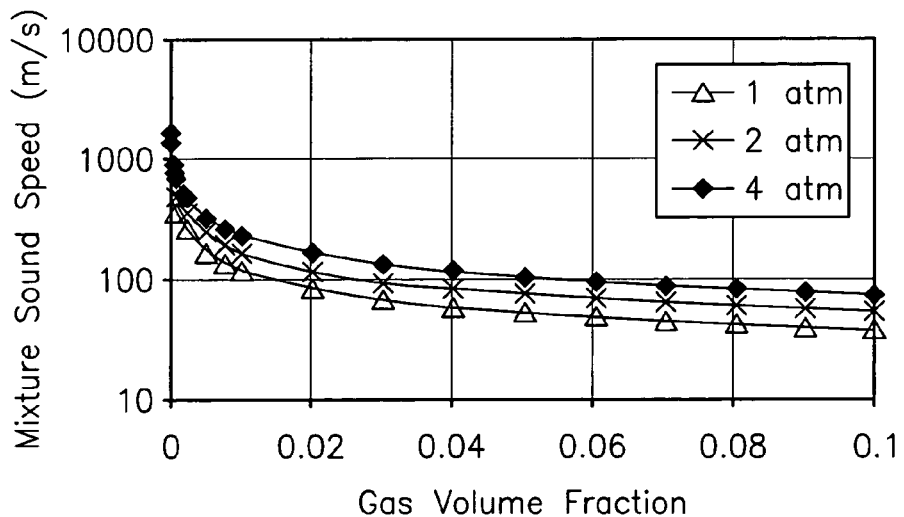
FIG. 21 is a plot of mixture sound speed as a function of gas volume fraction for a 5% consistency slurry over a range of process pressures.

The effect of process pressure on the relationship between sound speed and entrained air volume fraction is shown in FIG. 21.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\Box_p$ is the volumetric phase fraction of the particles in the mixture.

Figure 22:
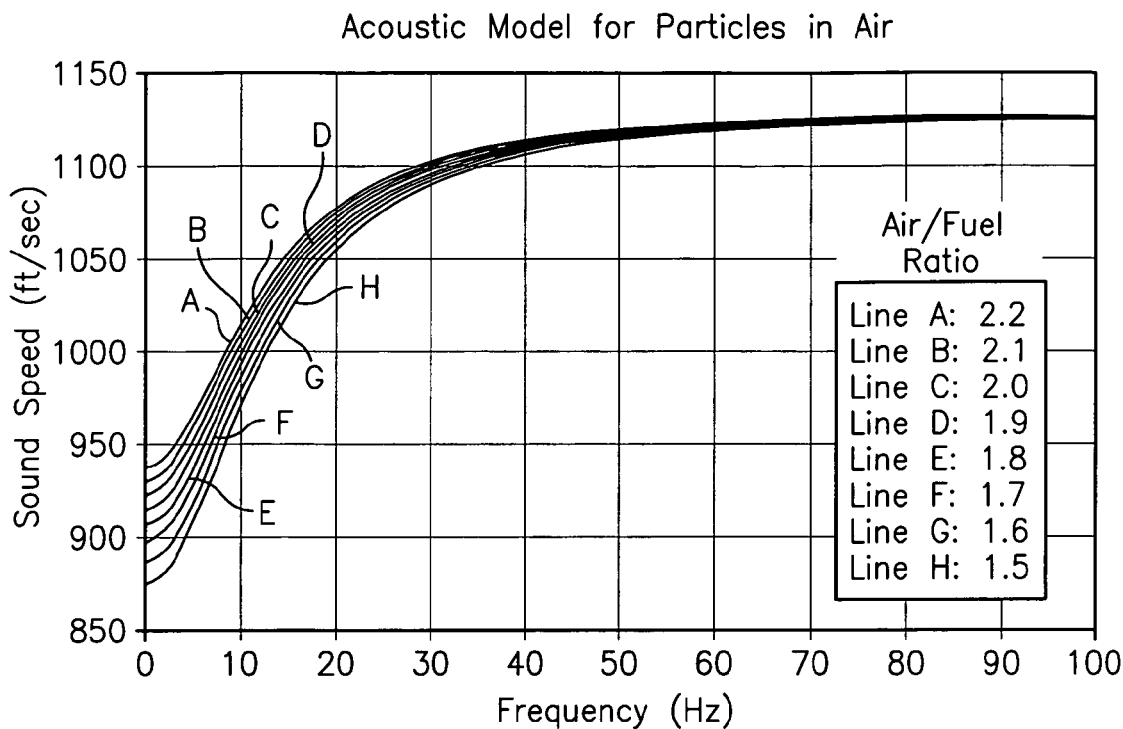
FIG. 22 is a plot of sound speed as a function of frequency for air/particle mixtures with fixed particle size and varying air-to-particle mass ratio.
Figure 23:
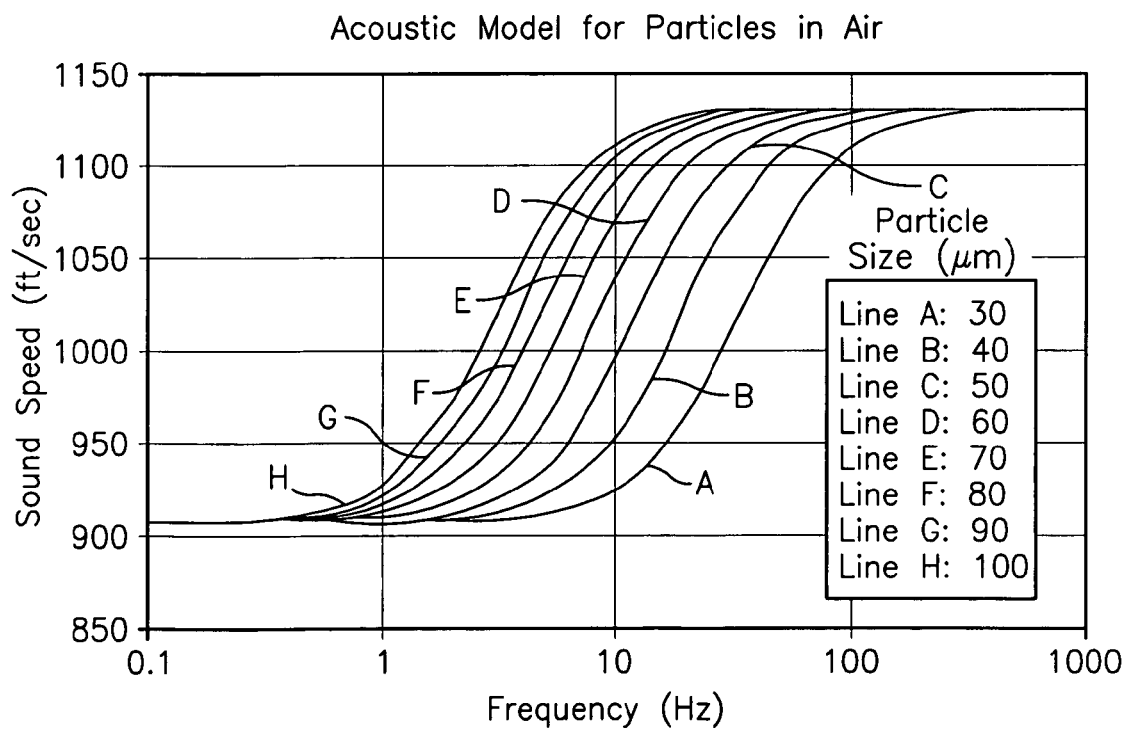
FIG. 23 is a plot of sound speed as a function of frequency for air/particle mixtures with varying particle size where the air-to-particle mass ratio is fixed.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 22 and FIG. 23 show the dispersive behavior in relations to the speed of sound for coal/air mixtures with parameters typical of those used in pulverized coal deliver systems.

In particular FIG. 22 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 23 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 22 and FIG. 23 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 16 and FIG. 19 depict two different embodiments of the flow logic 36 to measure various parameters of the flow process, the present invention contemplates that the functions of these two embodiments may be performed by a single flow logic 36.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

What is claimed is:

1. A sensor comprising:
   at least one cable extending around at least a portion of a circumference of a pipe, the at least one cable including:
      a first electrical conductor,
      a piezoelectric material disposed around the first electrical conductor, and
      a second electrical conductor disposed around the piezoelectric material;
   an electrical insulator disposed between the at least one cable and the pipe; and
   a clamp attached to opposing ends of the at least one cable for holding the at least one cable in tension around the pipe;
   wherein the at least one cable provides a signal indicative of unsteady pressure within the pipe.

2. The sensor of claim 1, wherein the at least one cable includes a plurality of cables having a common outer jacket for securing the plurality of cables together as a ribbon.

3. The sensor of claim 1, further comprising:
a band wrapped around the at least one cable, wherein the band compresses the at least one cable toward the pipe.

4. The sensor of claim 3, wherein the at least one cable is attached to the band.

5. The sensor of claim 4, wherein the at least one cable is attached to the band by at least one of: adhesive, epoxy, and heat-shrink material.

6. The sensor of claim 3, further comprising:
at least one spacer disposed between the band and the pipe, the at least one spacer being positioned proximate the ends of the at least one cable for preventing the ends of the at least one cable from being pinched when the band is tightened around the at least one cable.

7. The sensor of claim 1, further comprising:
a protective sheet disposed between the at least one cable and the pipe.

8. The sensor of claim 1, wherein the at least one cable is mechanically coupled to a protective sheet, the protective sheet being disposed between the at least one cable and the pipe.

9. The sensor of claim 1, wherein the at least one cable includes a plurality of cables electrically connected in parallel.

10. The sensor of claim 1, wherein the first electrical conductor has a cross-sectional shape selected from one of: polygonal, substantially flat, oval, and ovoid.

11. The sensor of claim 1, wherein the first electrical conductor has a round cross-sectional shape.

12. A method of installing at least one sensor on a pipe, the method comprising:
wrapping at least one cable around at least a portion of a circumference of the pipe, the at least one cable including:
a first electrical conductor,
a piezoelectric material disposed around the first electrical conductor, and
a second electrical conductor disposed around the piezoelectric material;
disposing an electrical insulator between the at least one cable and the pipe;
attaching a clamp to opposing ends of the at least one cable for holding the at least one cable in tension around the pipe; and
electrically connecting the at least one cable to provide an unsteady pressure within the pipe.

13. The method of claim 12, wherein the at least one cable includes a plurality of cables having a common outer jacket securing the plurality of cables together as a ribbon.

14. The method of claim 12, further comprising:
tightening a band around the at least one cable, wherein the band compresses the at least one cable toward the pipe.

15. The method of claim 14, wherein the at least one cable is attached to the band before the at least one cable is wrapped around the pipe.

16. The method of claim 15, wherein the at least one cable is attached to the band by at least one of: adhesive, epoxy, and heat-shrink material.

17. The method of claim 14, further comprising:
disposing at least one spacer between the band and the pipe, the at least one spacer being positioned proximate the ends of the at least one cable for preventing the ends of the at least one cable from being pinched when the band is tightened around the at least one cable.

18. An apparatus comprising:
an array of sensors, having at least three sensors disposed at different axial locations along a pipe, wherein the sensor provides a signal indicative of unsteady pressure within the pipe, each of the sensors including at least one cable extending around at least a portion of a circumference of the pipe, each cable including:
a first electrical conductor,
a piezoelectric material disposed around the first electrical conductor,
a clamp attached to opposing ends of the each cable for holding each cable in tension around the pipe; and
a second electrical conductor disposed around the piezoelectric material;
an electrical insulator disposed between the at least one cable and the pipe; and
a signal processor configured to:
receive the signal indicative of unsteady pressure within the pipe from the at least one cable in each sensor, and
determine a parameter of the fluid in response to the signals.

19. The apparatus of claim 18, wherein the parameter of the fluid includes at least one of density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

20. The apparatus of claim 18, wherein the signal processor determines a velocity of the fluid in the pipe and/or a speed of sound propagating though the fluid in response to an array processing algorithm.

21. The apparatus of claim 18, wherein the array of sensors are interconnected to maintain proper spacing therebetween.

22. The apparatus of claim 18, further comprising:
a plurality of bands, one of the plurality of bands wrapped around a corresponding one of the plurality of cables and securing the corresponding cable to the pipe.

23. The apparatus of claim 22, further comprising:
a plurality of spacers, at least one of the plurality of spacers disposed between each of the plurality of bands and the pipe, the spacers being positioned proximate the ends of the cables for preventing the ends of the cables from being pinched when the band is tightened around the cables.

24. The apparatus of claim 22, wherein each cable is attached to a respective band.

25. The apparatus of claim 24, wherein each cable is attached to a respective band by at least one of: adhesive, epoxy, and heat-shrink material.

26. The apparatus of claim 22, further comprising:
at least one spacer disposed between the band and the pipe, the at least one spacer being positioned proximate the ends of each cable for preventing the ends of each cable from being pinched when the band is tightened around each respective cable.

27. The apparatus of claim 18, further comprising:
a protective sheet disposed between each cable and the pipe.

28. The apparatus of claim 18, wherein each cable is mechanically coupled to a protective sheet, the protective sheet being disposed between each cable and the pipe.

29. The apparatus of claim 18, wherein each cable includes a plurality of cables electrically connected in parallel.

30. A sensor comprising;
 a plurality of cables disposed adjacent to each other in a common plane and extending around at least a portion of a circumference of a pipe, each of the cables including:
  a first electrical conductor,
  a piezoelectric material disposed around the first electrical conductor, and
  a second electrical conductor disposed around the piezoelectric material;
 at least one electrical insulator disposed between the plurality of cables and the pipe; and
 a clamp attached to opposing ends of the plurality of cables for holding the plurality of cables in tension around the pipe;
 wherein the plurality of cables provide a respective signal indicative of unsteady pressure within the pipe.

31. The sensor of claim 30, wherein the plurality of cables have a common outer jacket for securing the plurality of cables together as a ribbon.

32. The sensor of claim 30, wherein the plurality of cables are each discrete cables separate from each other.

33. The sensor of claim 30, wherein the plurality of cables have a common outer jacket over at least a portion of the length of the cables.

34. The sensor of claim 30, wherein the common plane of the plurality of cables is parallel to the outer surface of the pipe.

35. The sensor of claim 30, further comprising:
 a band wrapped around the plurality of cables, wherein the band compresses the plurality of cables toward the pipe.

36. The sensor of claim 35, wherein the plurality of cables is attached to the band.

37. The sensor of claim 36, wherein the plurality of cables is attached to the band by at least one of: adhesive, epoxy, and heat-shrink material.

38. The sensor of claim 35, further comprising:
 at least one spacer disposed between the band and the pipe, the at least one spacer being positioned proximate the ends of the plurality of cables for preventing the ends of the plurality of cables from being pinched when the band is tightened around the plurality of cables.

39. The sensor of claim 30, further comprising:
 a protective sheet disposed between the plurality of cables and the pipe.

40. The sensor of claim 30, wherein the plurality of cables is mechanically coupled to a protective sheet, the protective sheet being disposed between the plurality of cables and the pipe.

41. The sensor of claim 30, wherein the plurality of cables are electrically connected in parallel.

* * * * *